United States Patent
Endo et al.

(10) Patent No.: US 9,224,258 B2
(45) Date of Patent: Dec. 29, 2015

(54) IMAGE READING DEVICE

(71) Applicant: Mitsubishi Electric Corporation, Chiyoda-ku (JP)

(72) Inventors: Takafumi Endo, Tokyo (JP); Yohei Nokami, Tokyo (JP); Shigeru Toyota, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/454,459

(22) Filed: Aug. 7, 2014

(65) Prior Publication Data
US 2014/0347713 A1 Nov. 27, 2014

Related U.S. Application Data

(63) Continuation of application No. 11/467,399, filed on Aug. 25, 2006, now Pat. No. 8,837,025.

(30) Foreign Application Priority Data

Mar. 15, 2006 (JP) ................. 2006-070519

(51) Int. Cl.
G03H 1/00 (2006.01)
G03H 1/10 (2006.01)
G03H 1/04 (2006.01)
G07D 7/12 (2006.01)
G03H 1/22 (2006.01)
G07D 7/00 (2006.01)

(52) U.S. Cl.
CPC ............. *G07D 7/128* (2013.01); *G03H 1/0011* (2013.01); *G03H 1/22* (2013.01); *G03H 1/2286* (2013.01); *G07D 7/0046* (2013.01); *G03H 2001/2223* (2013.01); *G03H 2001/2244* (2013.01); *G03H 2222/18* (2013.01); *G03H 2222/34* (2013.01)

(58) Field of Classification Search
None
See application file for complete search history.

(56) References Cited

U.S. PATENT DOCUMENTS 5,489,992 A 2/1996 Endo
5,917,798 A 6/1999 Horimai et al.
(Continued)

FOREIGN PATENT DOCUMENTS

EP 1 482 456 A2 12/2004
JP 61-201396 9/1986
(Continued)

OTHER PUBLICATIONS

Japanese Office Action for Japanese Patent Application No. 2009-180585, dated Jun. 5, 2012 and mailed Jun. 12, 2012, with English translation of relevant portions.

*Primary Examiner* — Jade R Chwasz
(74) *Attorney, Agent, or Firm* — Oblon, McClelland, Maier & Neustadt, L.L.P.

(57) ABSTRACT

An image reading device having a conveying unit for conveying an irradiated member that has a hologram area in a conveying direction; a first light source for applying light to an irradiated part in the hologram area; and a second light source separated from the first light source along the conveying direction and applying light to an irradiated part in the hologram area when the hologram area is conveyed by a prescribed distance. An irradiation angle at which the irradiated part is irradiated with the light of the first light source is made to be different from an irradiation angle at which the irradiated part is irradiated with the light of the second light source when the hologram part is conveyed by the prescribed distance. Lights reflected by the hologram area are respectively received to detect an electric signal of the hologram area of the irradiated member.

2 Claims, 19 Drawing Sheets

(56) References Cited

U.S. PATENT DOCUMENTS

| | | |
|---|---|---|
| 6,473,165 B1 | 10/2002 | Coombs et al. |
| 6,529,269 B1 | 3/2003 | Sugata |
| 6,797,974 B2 | 9/2004 | Philipp et al. |
| 6,969,838 B2 | 11/2005 | Endo et al. |
| 7,711,175 B2 | 5/2010 | Endo et al. |
| 7,859,726 B2 | 12/2010 | Endo et al. |
| 7,982,924 B2 | 7/2011 | Endo et al. |
| 8,059,315 B2 | 11/2011 | Endo et al. |
| 2005/0129282 A1 | 6/2005 | O'Doherty et al. |
| 2007/0216976 A1 | 9/2007 | Endo et al. |
| 2008/0304121 A1 | 12/2008 | Endo et al. |

FOREIGN PATENT DOCUMENTS

| | | |
|---|---|---|
| JP | 05-217051 | 8/1993 |
| JP | 06-333123 | 12/1994 |
| JP | 08-163320 | 6/1996 |
| JP | 10-124872 | 5/1998 |
| JP | 10-512982 | 12/1998 |
| JP | 11-039534 | 2/1999 |
| JP | 2000-293105 | 10/2000 |
| JP | 2002-260051 | 9/2002 |
| JP | 2003-46726 | 2/2003 |
| JP | 2003-87564 | 3/2003 |
| JP | 2003-521050 | 7/2003 |
| JP | 2005-182582 | 7/2005 |
| WO | WO 01/54077 A1 | 7/2001 |
| WO | WO 2004080865 A1 | 9/2004 |

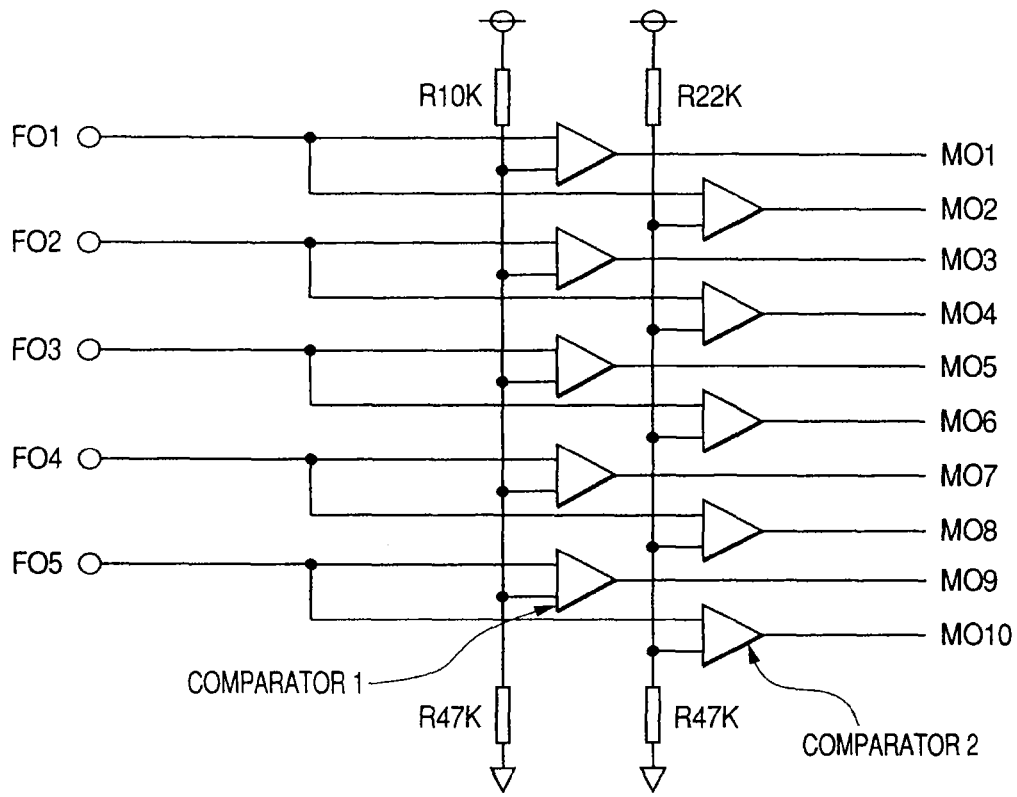

FIG. 18

HOLOGRAM DISTRIBUTION (MAP)

ADDRESS OF DATA STORING RAM — BELT TYPE HOLOGRAM

| BIT No. | 1 | 2 | ... | 100 | 101 | 102 | 103 | 104 | 105 | 106 | 107 | ... | 1280 |
|---|---|---|---|---|---|---|---|---|---|---|---|---|---|
| 1 | 0 | 0 | | 0 | 0 | 0 | 0 | 0 | 0 | 0 | 0 | | 0 |
| 2 | 0 | 0 | | 0 | 0 | 0 | 0 | 0 | 0 | 0 | 0 | | 0 |
| ... | | | | | | | | | | | | | |
| 1000 | 0 | 0 | | 15 | 35 | 35 | 40 | 40 | 40 | 35 | 25 | | 0 |
| 1001 | 0 | 0 | | 10 | 30 | 40 | 35 | 45 | 45 | 35 | 30 | | 0 |
| 1002 | 0 | 0 | | 15 | 30 | 40 | 40 | 45 | 40 | 35 | 25 | | 0 |
| 1003 | 0 | 0 | | 25 | 35 | 40 | 40 | 45 | 40 | 30 | 20 | | 0 |
| 1004 | 0 | 0 | | 10 | 30 | 40 | 35 | 45 | 40 | 35 | 25 | | 0 |
| 1005 | 0 | 0 | | 15 | 30 | 40 | 40 | 40 | 35 | 35 | 20 | | 0 |
| 1006 | 0 | 0 | | 15 | 25 | 40 | 35 | 45 | 40 | 40 | 20 | | 0 |
| 1007 | 0 | 0 | | 10 | 30 | 35 | 40 | 40 | 35 | 35 | 20 | | 0 |
| 1008 | 0 | 0 | | 15 | 35 | 40 | 40 | 40 | 40 | 35 | 30 | | 0 |
| 1009 | 0 | 0 | | 20 | 30 | 35 | 40 | 45 | 40 | 35 | 25 | | 0 |
| 1010 | 0 | 0 | | 15 | 30 | 35 | 35 | 45 | 35 | 30 | 25 | | 0 |
| 1011 | 0 | 0 | | 20 | 30 | 35 | 40 | 40 | 40 | 35 | 20 | | 0 |
| 1012 | 0 | 0 | | 10 | 30 | 35 | 45 | 45 | 45 | 35 | 20 | | 0 |
| 1013 | 0 | 0 | | 10 | 30 | 35 | 40 | 40 | 40 | 35 | 20 | | 0 |
| 1014 | 0 | 0 | | 10 | 30 | 35 | 45 | 40 | 40 | 30 | 15 | | 0 |
| 1015 | 0 | 0 | | 10 | 35 | 40 | 25 | 35 | 45 | 35 | 20 | | 0 |
| 1016 | 0 | 0 | | 15 | 30 | 35 | 45 | 45 | 40 | 35 | 30 | | 0 |
| 1017 | 0 | 0 | | 10 | 30 | 35 | 40 | 45 | 40 | 35 | 25 | | 0 |
| 1018 | 0 | 0 | | 20 | 35 | 45 | 35 | 40 | 40 | 35 | 30 | | 0 |
| 1019 | 0 | 0 | | 15 | 30 | 45 | 45 | 40 | 45 | 40 | 30 | | 0 |
| 1020 | 0 | 0 | | 10 | 25 | 35 | 45 | 40 | 40 | 35 | 30 | | 0 |
| 1021 | 0 | 0 | | 10 | 30 | 40 | 45 | 45 | 40 | 35 | 25 | | 0 |
| ... | | | | | | | | | | | | | |
| 1871 | 0 | 0 | 0 | 0 | 0 | 0 | 0 | 0 | 0 | 0 | 0 | | 0 |
| 1872 | 0 | 0 | 0 | 0 | 0 | 0 | 0 | 0 | 0 | 0 | 0 | | 0 |

BIT DATA IN MAIN SCANNING DIRECTION

IMAGE DATA IN CONVEYING LINE DIRECTION

FIG. 19A

FLOATING ISLAND TYPE HOLOGRAM

BIT DATA IN MAIN SCANNING DIRECTION → IMAGE DATA IN CONVEYING LINE DIRECTION

|      | 1 | 2 | ... | 887 | 888 | 889 | 890 | 891 | 892 | 893 | 894 | ... | 1280 |
|------|---|---|-----|-----|-----|-----|-----|-----|-----|-----|-----|-----|------|
| 1    | 0 | 0 | 0   | 0   | 0   | 0   | 0   | 0   | 0   | 0   | 0   |     | 0    |
| 2    | 0 | 0 | 0   | 0   | 0   | 0   | 0   | 0   | 0   | 0   | 0   |     | 0    |
| ...  |   |   |     |     |     |     |     |     |     |     |     |     |      |
| 1000 | 0 | 0 |     | 5   | 10  | 10  | 10  | 5   | 10  | 15  | 15  |     | 0    |
| 1001 | 0 | 0 |     | 5   | 5   | 5   | 10  | 0   | 5   | 10  | 15  |     | 0    |
| 1002 | 0 | 0 |     | 5   | 10  | 10  | 15  | 10  | 10  | 0   | 0   |     | 0    |
| 1003 | 0 | 0 |     | 0   | 10  | 10  | 20  | 25  | 20  | 10  | 10  |     | 0    |
| 1004 | 0 | 0 |     | 10  | 20  | 25  | 20  | 35  | 30  | 20  | 25  |     | 0    |
| 1005 | 0 | 0 |     | 15  | 20  | 25  | 35  | 35  | 35  | 30  | 20  |     | 0    |
| 1006 | 0 | 0 |     | 15  | 25  | 30  | 35  | 40  | 35  | 30  | 20  |     | 0    |
| 1007 | 0 | 0 |     | 10  | 20  | 35  | 40  | 40  | 35  | 30  | 20  |     | 0    |
| 1008 | 0 | 0 |     | 15  | 25  | 35  | 40  | 40  | 35  | 35  | 30  |     | 0    |
| 1009 | 0 | 0 |     | 20  | 20  | 35  | 40  | 45  | 40  | 35  | 25  |     | 0    |
| 1010 | 0 | 0 |     | 15  | 15  | 35  | 35  | 45  | 35  | 30  | 25  |     | 0    |
| 1011 | 0 | 0 |     | 0   | 20  | 35  | 40  | 40  | 35  | 25  | 20  |     | 0    |
| 1012 | 0 | 0 |     | 10  | 15  | 35  | 35  | 35  | 35  | 30  | 20  |     | 0    |
| 1013 | 0 | 0 |     | 0   | 15  | 30  | 40  | 40  | 35  | 25  | 20  |     | 0    |
| 1014 | 0 | 0 |     | 10  | 20  | 20  | 35  | 40  | 30  | 20  | 15  |     | 0    |
| 1015 | 0 | 0 |     | 10  | 15  | 20  | 25  | 35  | 30  | 20  | 15  |     | 0    |
| 1016 | 0 | 0 |     | 0   | 15  | 15  | 20  | 25  | 20  | 10  | 5   |     | 0    |
| 1017 | 0 | 0 |     | 10  | 10  | 10  | 15  | 10  | 10  | 0   | 0   |     | 0    |
| 1018 | 0 | 0 |     | 5   | 0   | 10  | 10  | 5   | 0   | 10  | 10  |     | 0    |
| 1019 | 0 | 0 |     | 0   | 5   | 10  | 5   | 5   | 0   | 10  | 5   |     | 0    |
| 1020 | 0 | 0 |     | 0   | 0   | 0   | 0   | 5   | 5   | 5   | 10  |     | 0    |
| 1021 | 0 | 0 |     | 10  | 0   | 0   | 5   | 10  | 0   | 10  | 0   |     | 0    |
| ...  |   |   |     |     |     |     |     |     |     |     |     |     |      |
| 1871 | 0 | 0 | 0   | 0   | 0   | 0   | 0   | 0   | 0   | 0   | 0   |     | 0    |
| 1872 | 0 | 0 | 0   | 0   | 0   | 0   | 0   | 0   | 0   | 0   | 0   |     | 0    |

FIG. 19B

FLOATING ISLAND TYPE HOLOGRAM

| 25 | 20 | 35 | 30 | 20 |
|----|----|----|----|----|
| 25 | 35 | 35 | 35 | 30 |
| 30 | 35 | 40 | 35 | 30 |
| 35 | 40 | 40 | 35 | 30 |
| 35 | 40 | 40 | 35 | 35 |
| 35 | 40 | 45 | 40 | 35 |
| 35 | 35 | 45 | 35 | 30 |
| 35 | 40 | 40 | 35 | 25 |
| 35 | 35 | 35 | 35 | 30 |
| 30 | 40 | 40 | 35 | 25 |
| 20 | 35 | 40 | 30 | 20 |
| 20 | 25 | 35 | 30 | 20 |

FIG. 19C

DATA OF RAM 3 (FLOATING ISLAND TYPE)

RELATIVE POSITION ↕ / RELATIVE LINE POSITION ↔

| n | n+1 | n+2 | n+3 | n+4 |
|---|-----|-----|-----|-----|
| — | —   | —   | —   | —   |
| — | —   | —   | —   | —   |
| — | 35  | 40  | 35  | —   |
| — | 40  | 40  | 35  | —   |
| — | 40  | 40  | 35  | —   |
| — | 40  | 45  | 40  | —   |
| — | 35  | 45  | 35  | —   |
| — | 40  | 40  | 35  | —   |
| — | 35  | 35  | 35  | —   |
| — | —   | —   | —   | —   |
| — | —   | —   | —   | —   |
| — | —   | —   | —   | —   |

IMAGE READING DEVICE

CROSS-REFERENCE TO RELATED APPLICATIONS

This application is a continuation application of and claims the benefit of priority from U.S. application Ser. No. 11/467,399, filed Aug. 25, 2006, which claims the benefit of priority from Japanese Patent Application No. 2006-070519, filed Mar. 15, 2006; the entire contents of each of the above are incorporated herein by reference.

BACKGROUND OF THE INVENTION

1. Field of the Invention

The present invention relates to an image reading device for reading a hologram part of an irradiated member such as a bank note.

2. Description of the Related Art

As such kind of reading device, for instance, a label identifying device disclosed in JP-A-2000-293105 has been hitherto known. In JP-A-2000-293105, a beam light is applied to a light receiving surface of a reflecting member of a light identifying label from one light source and the light receiving surface of the reflecting member converts the beam light to two reflected lights. Then, a first light component is supplied to a first sensor and a second light component is supplied to a second sensor. Further, in a recognizing device for sheets described in JP-A-2006-39996, a structure is disclosed that lights outputted from a lighting device and penetrating the sheets are guided to a light receiving element through a lens array.

SUMMARY OF THE INVENTION

However, in the label identifying device disclosed in JP-A-2000-293105, the light from the light source is applied to the light receiving surface of the reflecting member of the label and the two kinds of light components reflected by the light receiving surface are detected by the two kinds of sensors whose installation angles are different from each other. Since a lens for focusing the lights does not exist, a problem arises that a read position of an image to be identified or a focusing position is not determined, so that whether or not the label is true can be macroscopically identified, but the label is insufficiently identified in view of a minute pixel level. Further, in the recognizing device disclosed in JP-A-2006-39996, the configurations of the sheets can be recognized, however, parts of the sheets that the lights do not penetrate cannot be undesirably read in principle.

It is an object of the present invention to provide a new image reading device in which lights reflected in an area where an optical change pattern such as a hologram is pressed and fixed to or printed on an irradiated member are received to read a hologram area and discriminate a truth or falseness thereof for the irradiated member.

It is another object of the present invention to provide an image reading device capable of more highly accurately discriminating a truth or a falseness in which white light sources are applied to an irradiated part in a hologram part (area) provided along the conveying path of an irradiated member at respectively different angles to detect the difference of spectrum in reflected lights generated in the hologram area.

According to a first aspect of the invention, there is provided an image reading device including: a conveying unit for conveying an irradiated member that has a hologram area in a conveying direction; a first light source for applying light to an irradiated part in the hologram area; and a second light source separated from the first light source along the conveying direction and applying light to an irradiated part in the hologram area when the hologram area is conveyed by a prescribed distance. An irradiation angle at which the irradiated part is irradiated with the light of the first light source is made to be different from an irradiation angle at which the irradiated part is irradiated with the light of the second light source when the hologram part is conveyed by the prescribed distance, and lights reflected by the hologram area are respectively received to detect an electric signal of the hologram area of the irradiated member.

According to a second aspect of the invention, there is provided the image reading device according to the first aspect wherein the first light source has a light guide part for guiding the light to the irradiated part and is provided at a remoter position from the irradiated part than the second light source.

According to a third aspect of the invention, there is provided an image reading device including: one and the other light sources; a light guide part for guiding the light of the one light source to an irradiated part in a hologram area of an irradiated member; a lens array for converging the lights of the one and the other light sources reflected by the irradiated part of the hologram area; and first and second image sensors having sensors for receiving the lights converged by the lens array. The first and second image sensors are separated from each other by a prescribed distance in a conveying direction, and when the reading of the light by the one light source is carried out in the first image sensor, the reading of the light by the other light source is carried out in the second image sensor to detect an electric signal of the hologram area of the irradiated member.

According to a fourth aspect of the invention, there is provided the image reading device according to the third aspect, wherein the first and second image sensors are formed integrally.

According to a fifth aspect of the invention, there is provided an image reading device including: a conveying unit for conveying an irradiated member that has a hologram area in a conveying direction; a first light source provided on a first substrate; a light guide part for guiding light so as to irradiate the hologram area of the irradiated member with the light of the first light source; a first lens array for converging the lights reflected by the hologram area; a first sensor provided on a second substrate to receive the lights converged by the first lens array; a second lens array opposed to the first lens array; a first light shield member provided between the first lens array and the second lens array and disposed on the second substrate; a second light source provided on the first light shield member to apply light to an irradiated part of the hologram area conveyed by the conveying unit at an irradiation angle different from an irradiation angle at which the hologram area is irradiated with the light of the first light source; a second sensor provided on the second substrate for receiving the lights of the second light source reflected by the hologram area and converged by the second lens array; and a checking unit for checking whether a hologram in the hologram area is true or false in accordance with output signals of the first and second sensors.

According to a sixth aspect of the invention, there is provided the image reading device according to the fifth aspect, wherein the first light source is a plasma light source and the second light source is an LED light source.

According to a seventh aspect of the invention, there is provided the image reading device according to the fifth aspect, wherein light applying directions to the hologram area by the first and second light sources are respectively considered to be components of the conveying direction of the irradiated member.

According to an eighth aspect of the invention, there is provided the image reading device according to the sixth aspect, wherein in the second light source, one angular part of a prism shaped reflecting member is cut out to form an output part of light.

According to a ninth aspect of the invention, there is provided the image reading device according to the seventh aspect, wherein a second light shield member is provided at a part opposite to the output part of the light of the second light source.

According to a tenth aspect of the invention, there is provided the image reading device according to the fifth aspect, wherein the second light source is supplied electric power from the second substrate through the first light shield member.

According to a eleventh aspect of the invention, there is provided the image reading device according to the first aspect, wherein the first light source is a white colored light source and the second light source is a quasi-white colored light source for emitting lights of a plurality of wavelengths.

According to a twelfth aspect of the invention, there is provided the image reading device according to the third aspect, wherein the first and second image sensors are arranged both in the front side and the back side of the irradiated member and the relative positions thereof are shifted in the conveying direction of the irradiated member.

According to a thirteenth aspect of the invention, there is provided an image reading device including: a conveying unit for conveying an irradiated member that has a hologram area in a conveying direction; a first light source for applying light to an irradiated part in the hologram area; a second light source separated from the first light source along the conveying direction, applying light to an irradiated part in the hologram area when the hologram area is conveyed by a prescribed distance, and provided so as to apply light to the irradiated part when the hologram area is conveyed by the prescribed distance at an irradiation angle different from an irradiation angle at which the irradiated part is irradiated with the light of the first light source; first and second lens arrays for respectively converging the lights of the first and second light sources reflected by the irradiated parts in the hologram area; first and second sensors for receiving the lights respectively converged by the first and second lens arrays to photoelectrically convert the lights; and a checking unit for comparing output signals of the first and second sensors with each other to check whether a hologram in the hologram area of the irradiated member is true or false.

According to a fourteenth aspect of the invention, there is provided an image reading device including: a conveying unit for conveying an irradiated member that has a hologram area in a conveying direction; a first light source for applying light to an irradiated part in the hologram area; a second light source separated from the first light source along the conveying direction, applying light to an irradiated part in the hologram area when the hologram area is conveyed by a prescribed distance, and provided so as to apply light to the irradiated part when the hologram area is conveyed by the prescribed distance at an irradiation angle different from an irradiation angle at which the irradiated part is irradiated with the light of the first light source; first and second lens arrays for respectively converging the lights of the first and second light sources reflected by the irradiated parts in the hologram area; first and second sensors for receiving the lights respectively converged by the first and second lens arrays to photo-electrically convert the lights; a difference detecting unit for detecting a difference value of output signals of the first and second sensors; a storing unit for storing a true hologram distribution map in the hologram area of the irradiated member; and a checking unit for comparing the detecting signal of the difference detecting unit with true hologram distribution map data taken from the storing unit to check whether the hologram in the hologram area of the irradiated member is true or false.

According to a fifteenth aspect of the invention, there is provided the image reading device according to fourteenth aspect, wherein the checking unit temporarily stores a difference value of the output signals of the first and second sensors in a RAM.

According to a sixteenth aspect of the invention, there is provided the image reading device including: a conveying unit for conveying an irradiated member that has a hologram area in a conveying direction; a hologram detecting unit for detecting the passage of the hologram area of the irradiated member to output a detecting signal; a first light source for applying light to an irradiated part in the hologram area of the irradiated member; a second light source separated from the first light source along the conveying direction of the irradiated member and applying light to an irradiated part in the hologram area when the irradiated member is conveyed by a prescribed distance at an irradiation angle different from a prescribed irradiation angle in the first light source; a lighting control unit for respectively controlling the first and second light sources to be turned on when the detecting signal of the hologram detecting unit is received; and a sensor IC for respectively receiving the lights by the first and second light sources reflected from the hologram area to detect an electric signal of a hologram in the hologram area of the irradiated member.

According to a seventeenth aspect of the invention, there is provided the image reading device according to the sixteenth aspect, wherein the lighting control unit controls the first light source in a pre-stage in the conveying direction of the irradiated member to be turned on, and then, controls the second light source in a post-stage to be turned on after a prescribed time elapses.

According to a eighteenth aspect of the invention, there is provided the image reading device according to the sixteenth aspect, wherein the lighting control unit controls the first or the second light source to be turned on only for a time of the passage of the hologram area of the irradiated member in the conveying direction.

According to a nineteenth aspect of the invention, there is provided the image reading device according to the sixteenth aspect, wherein the lighting control unit detects that the hologram area of the irradiated member passes the hologram detecting unit in a time period where the level of the detecting signal from the hologram detecting unit is not higher than a prescribed level.

According to a twentieth aspect of the invention, there is provided a note reading method including: applying light to the hologram area of a note at a prescribed irradiation angle; receiving a reflected light from the hologram area and converting the light to an electric signal: applying light to the hologram area at an irradiation angle different from the prescribed irradiation angle when the note is conveyed by a prescribed distance to receive the reflected light and convert the light to an electric signal and checking whether a hologram in the hologram area of the note is true or false on the basis of these electric signals.

According to a twenty-first aspect of the invention, there is provided a note reading method including: applying light to a note having a hologram area at a prescribed irradiation angle; receiving a reflected light to convert the light to an electric signal; applying light to the note conveyed by a prescribed distance at an irradiation angle different from the prescribed irradiation angle to receive the reflected light and convert the light to an electric signal and detecting the hologram area of the note to check its truth or falseness on the basis of these electric signals.

According to above configuration, since the irradiated parts are provided along the conveying path of the irradiated member, are respectively irradiated at different angles and the reflected lights thereof are respectively photoelectrically converted for each pixel by the sensors respectively provided correspondingly to the reflected lights to obtain outputs. Thus, the obtained outputs are collated with prescribed hologram collating data. Accordingly, even when the image information of the hologram area of the irradiated member is finely formed pattern, it can be accurately discriminated whether the hologram is true or false.

According to the above configuration, since the irradiated member is irradiated with the lights including a plurality of spectrums and the reflected lights from the irradiated member are received, an output corresponding to the color of the hologram can be obtained as image information. Further, after the reflected lights are allowed to pass through a color filter provided in the sensor, a photoelectrically converted output is obtained. Thus, the light of a strong spectrum is filtered, so that the hologram emitting weak lights can be effectively checked.

BRIEF DESCRIPTION OF THE DRAWINGS

FIG. 13A shows a monochromatic reading sensor and FIG. 13B shows a color reading sensor.

FIG. 15 is a signal processing circuit diagram of outputs of a photo-sensor of the image reading device according to the first embodiment of the present invention.

FIG. 16 is a logic diagram of the outputs of the photo-sensor of the image reading device according to the first embodiment of the present invention.

FIG. 18 is a hologram diagram of the image reading device according to the first embodiment of the present invention.

FIGS. 19A to 19C are floating island type hologram distribution diagram of the image reading device according to the first embodiment of the present invention. FIG. 19A shows entire data stored in a RAM, FIG. 19B shows reduced hologram data and FIG. 19C shows collating data.

DETAILED DESCRIPTION OF THE INVENTION

First Embodiment (Structure)

Figure 1:
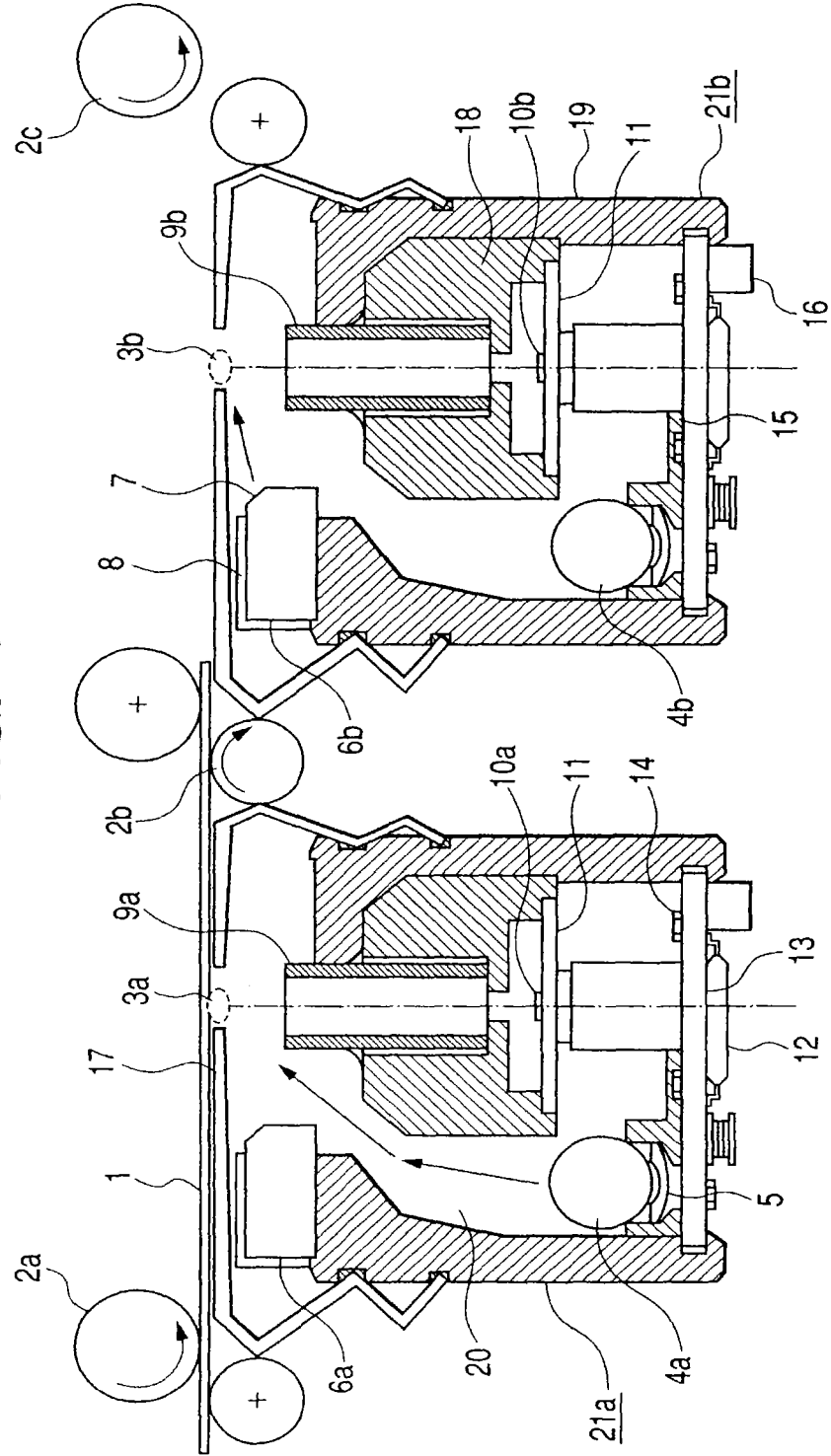
FIG. 1 is a sectional structural view of an image reading device according to a first embodiment of the present invention.

Now, a first embodiment of the present invention will be described below by referring to FIG. 1. FIG. 1 is a sectional structural view of an image reading device according to the first embodiment. In FIG. 1, reference numeral 1 designates an irradiated member such as a note, valuable securities or a check, and including an area that light relatively hardly penetrates such as a thermal compression bonded part in which a hologram process (holography) is applied to a base material preferably having transmitting characteristics, a printed part, a seal bonded part and a part whose color changes depending on an angle of view.

2 designates a conveying roller (a conveying unit) for conveying the object 1 (note) to be irradiated with light. 2a designates a conveying roller of a sheet feed side, 2b designates a relay conveying roller and 2c is a conveying roller of a sheet discharge side. 3 designates an irradiated part provided in a conveying path of the note 1. 3a designates a first irradiated part and 3b designates a second irradiated part. 4 designates a white colored light source (a first light source) using a plasma excitation such as a fluorescent lamp, a cold cathode tube or the like. 4a applies light to the irradiated part 3a and 4b applies light to the irradiated part 3b. 5 designates a reflecting plate for efficiently applying the light generated in the white colored light source 4 to the irradiated part 3. 6 designates a quasi-white colored light source (a second light source) composed of an LED array on which a plurality of light emitting sources such as RGB or a rod shaped light source. 6a applies light to the irradiated part 3a and 6b applies light to the irradiated part 3b. 7 designates a light output part of the quasi-white colored light source 6. 8 designates a white colored cover for preventing the leakage of the light of the quasi-white colored light source 6 and serving as a reflecting plate. 9 designates a lens array (a rod lens array) for converging the reflected lights of the light applied to the note 1. 9a converges the reflected lights of the note 1 from the irradiated part 3a and 9b converges the reflected lights of the note 1 from the irradiated part 3b.

10 designates a sensor (a light receiving part) composed by linearly arranging a plurality of semiconductor chips that receive the light converged by the lens array 9 and perform photoelectric conversion and including a sensor IC in which photoelectric conversion parts (photoelectric conversion circuits) respectively for pixels and driving circuits thereof are incorporated. 10a receives the lights from the lens array 9a and 10b receives the lights from the lens array 9b. 11 designates a sensor substrate on which the sensor 10 is arranged. 12 designates a signal processing IC (ASIC) for A/D converting an analog signal photoelectrically converted in the sensor 10, carrying out a signal process for each pixel and calculating and processing image information from the note 1. 13 designates a board formed with a printed circuit board on which electronic parts are mounted. 14 designates electronic parts such as a condenser and mounted on the board 13. 15 designates a relay connector for transmitting and receiving a signal or power between the sensor substrate 11 and the board 13. 16 designates an external connector supported on the back side of the board 13 for supplying electric power to a system signal (SCLK), a start signal (SI), a clock signal (CLK) and an input signal of a power source or a light source and additionally serves to input and output a control signal and output an image signal (SIG) to an external part.

17 designates a transmitting member composed of a plastic material that is provided along the conveying path. 18 designates an internal casing for accommodating and supporting the lens array 9 and the sensor substrate 11. 19 designates an external casing for accommodating and supporting the white colored light source 4, the quasi-white colored light source 6, the board 13, the transmitting member 17 and the internal casing 18. 20 designates a light guide path (a light guide part) provided in the external casing 19 for setting an incident angle of the light applied to the note 1 from the white colored light source 4 to a narrow angle. 21 designates a reflection type sensor structure (refer it to as a CIS) in which components excluding the conveying roller 2 are accommodated. 21a designates a first CIS for applying the light of the white colored light source 4a to the irradiated part 3a at a narrow angle. 21b designates a second CIS for applying the light of the quasi-white colored light source 6b to the light irradiated part 3b at a wide angle. In the drawing, the same reference numerals designate the same or equivalent parts.

In a reading device mounted on a sheet discriminating machine (a sheet discriminator) used in the field of a banking terminal device, a desired image may not be possibly read due to the difference between front and back images of the note 1 that is arbitrarily inserted and set. Accordingly, in the first embodiment, as shown in FIG. 2, a case will be described in which the image information of both surfaces of the note 1 is read at the same time to discriminate a truth or falseness.

Figure 2:
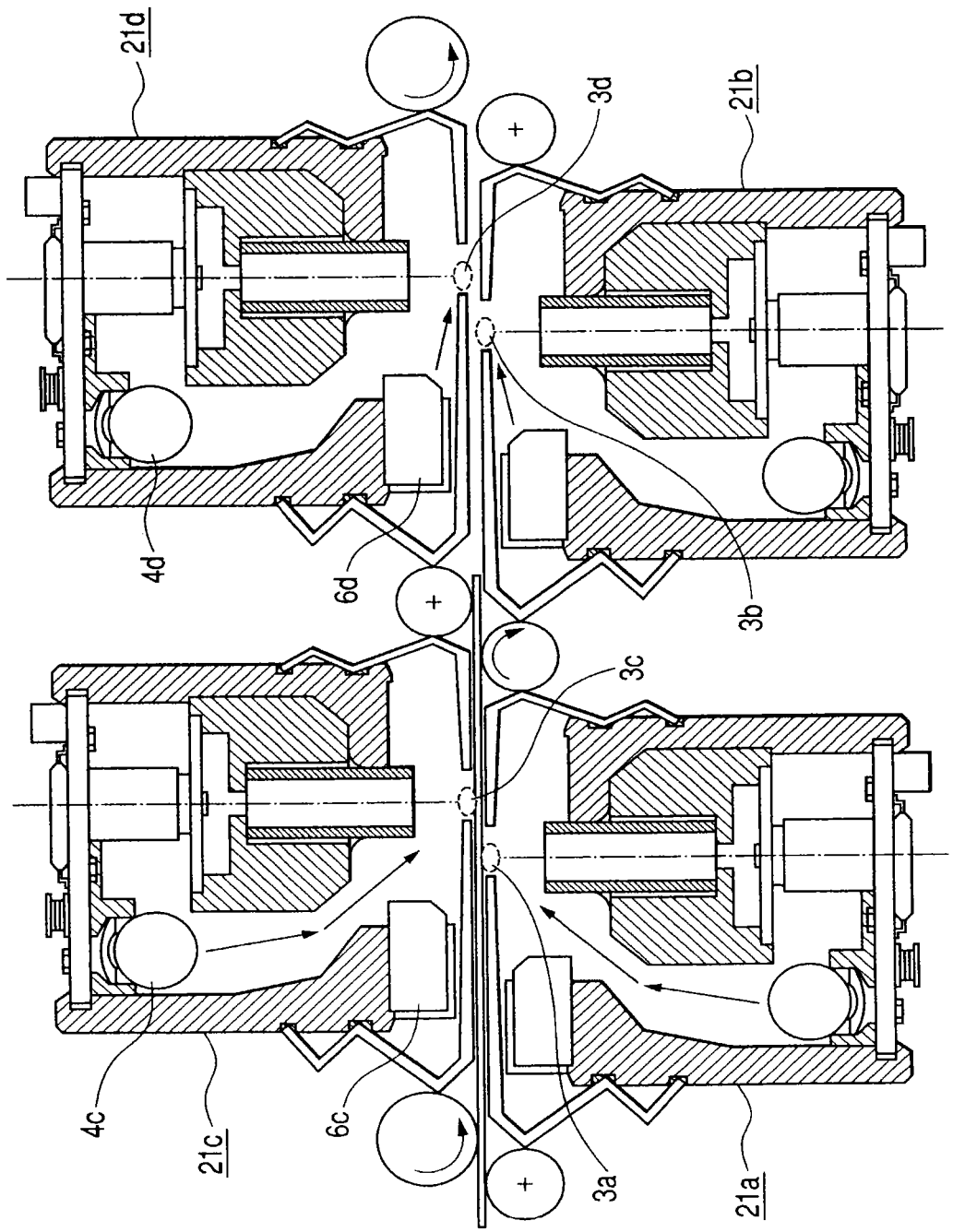
FIG. 2 is an entire sectional structural view of the image reading device according to the first embodiment of the present invention.

FIG. 2 is a sectional structural view of the image reading device in which the CIS 21 of the same structures are arranged in both the sides of the conveying path of the note 1. A CIS 21a and a CIS 21b are arranged on one surface of the conveying path of the note 1. On the other hand, a CIS 21c and a CIS 21d are vertically inverted from the CIS 21a and the CIS 21b and arranged on the other surface. Accordingly, in a main scanning direction (a read width direction) intersecting at right angles to the conveying direction of the note 1, the scanning directions of the CIS 21a and the CIS 21b are the same and the CIS 21a and the CIS 21b are scanned from a left end to a right end. The scanning directions of the CIS 21c and the CIS 21d are the same, however, the CIS 21c and the CIS 21d are scanned from a right end to a left end. Further, an irradiated part 3a and an irradiated part 3c, and an irradiated part 3b and an irradiated part 3d are spaced by a prescribed distance between them in the conveying path. In the drawing, the same reference numerals as those of FIG. 1 show the same or equivalent parts.

Figure 3:
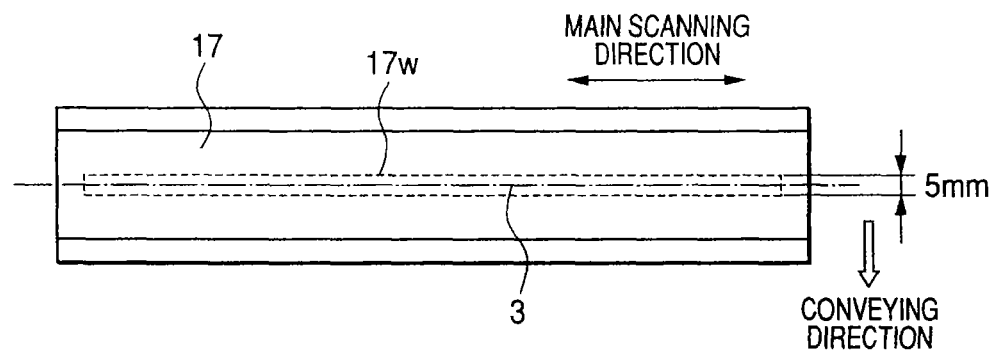
FIG. 3 is a plan view of a transmitting member of the image reading device according to the first embodiment of the present invention.

Now, the area of the irradiated part 3 will be described below with reference to FIG. 3. FIG. 3 is a plan view of the transmitting member 17 mounted on the CIS 21. 17w designates a groove (an opening part) of the transmitting member 17 provided in the converging area of the lens array 9. This opening part 17w is formed as a cavity with a width of 5 mm from one end to the other end in the main scanning direction with respect to the conveying direction of the note 1. In the transmitting member 17, a de-lustering and black coloring process are applied to the plastic material, lights applied to other parts than the opening part 17w are absorbed and lights radiated from the opening part 17w are applied to the note 1 as effective lights.

Figure 4:
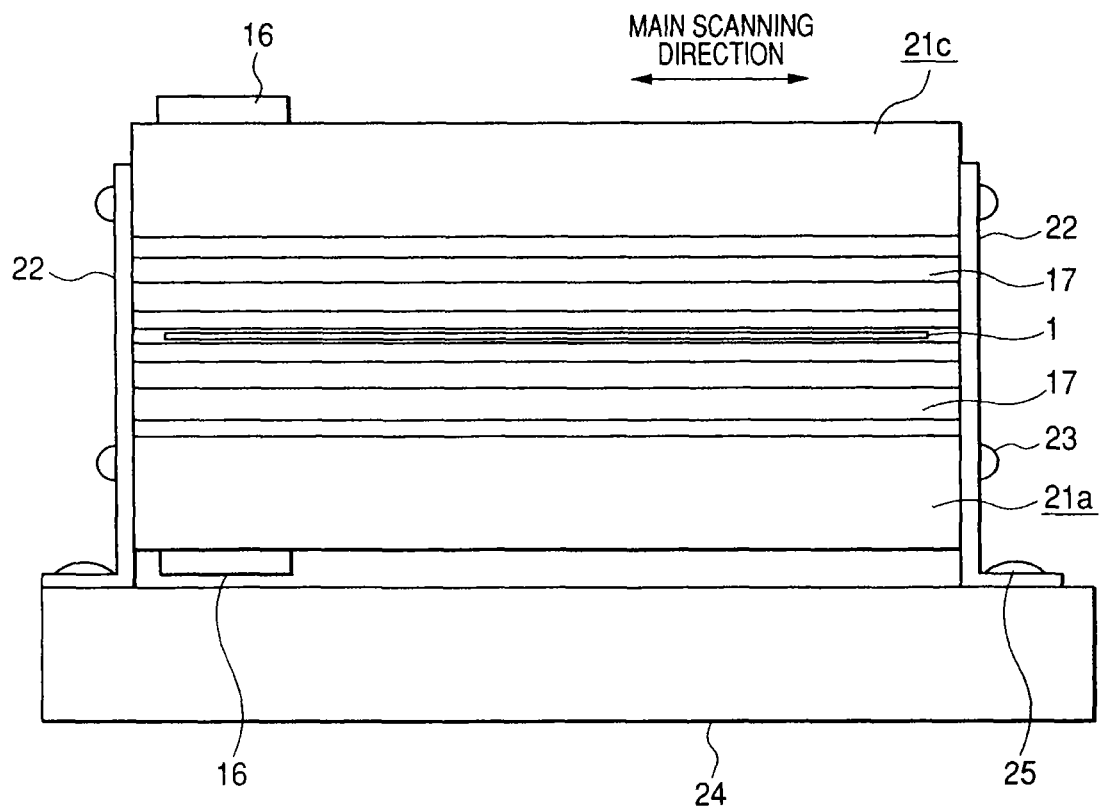
FIG. 4 is a side view of the image reading device according to the first embodiment of the present invention.

FIG. 4 is a side view of the image reading device with the conveying unit removed that is viewed from the main scanning direction. 22 designates a holder for fixing the CIS 21a and the CIS 21c. 23 designates a screw for attaching the CSI 21 and the holder 22. 24 is a system receiving base for fixing the CIS 21 to a system main body (a reading system) of the image reading device. 25 designates a screw for attaching the holder 22 and the system receiving base 24.

Figure 5:
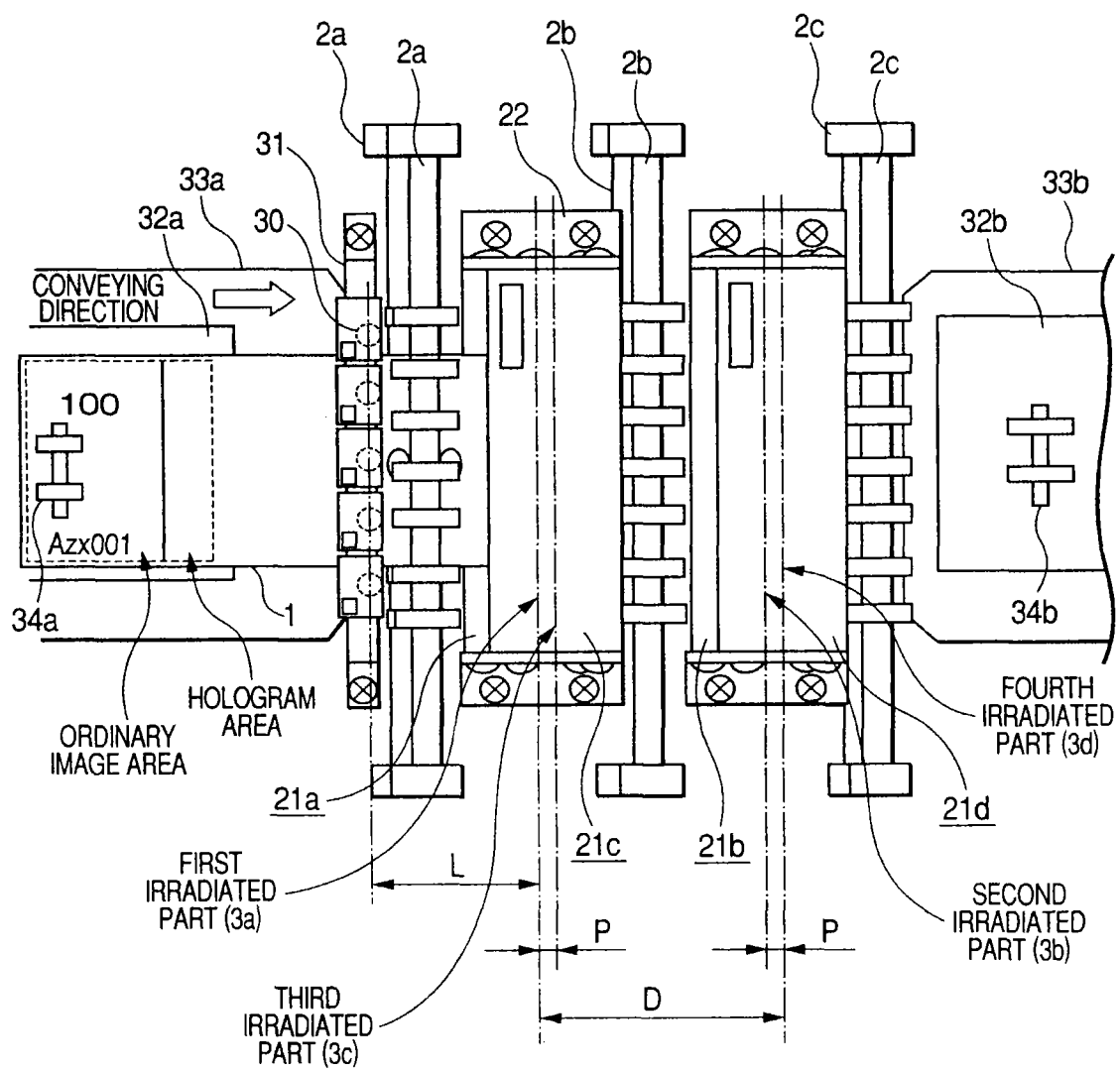
FIG. 5 is a plan view of the image reading device according to the first embodiment of the present invention.

FIG. 5 is a plan structural view of the image reading device according to the first embodiment including the conveying unit. 30 designates a detecting unit (refer it simply to as a "photo-sensor", hereinafter.) composed of a separate photo-sensor including a light emitting element and a light receiving elements and extending from one end to the other end of the note 1 in the main scanning direction for reading. The photo-sensor 30 is provided with a connector. The photo-sensor 30 is positioned and fixed to the system receiving base (not shown in the drawing) through a stay 31. The photo-sensor 30 is spaced from the irradiated part 3a by a prescribed distance (for instance, L=50 mm) in the direction opposite to the conveying direction of the note 1 so that the note 1 passes between the light emitting element and the light receiving element of the photo-sensor 30.

Then, in the photo-sensor 30, light outputted from the light emitting element is reflected on a reflecting part such as a hologram part of the note 1 and does not reach the light receiving element so that the level of the light receiving element is substantially zero. As for a light transmitting part of the note 1, the light penetrates the light transmitting part to reach the light receiving part, so that the level of the light receiving element shows a variation level. When there is no note 1, the level of the light emitting element shows a saturation value. Accordingly, in conveying the note 1, the photo-sensor 30 receives the light by the light receiving element in a level not higher than the saturation value until the note 1 completely passes. Further, while the note 1 passes the hologram area, the output of the light receiving element becomes zero.

32 designates a cassette for accommodating the note 1 that includes a cassette 32a of a sheet feed side and a cassette 32b of a sheet discharge side. 33 designates a note base for mounting the cassette 32 that includes a note base 33a of the sheet feed side and a note base 33b of the sheet discharge side. 34 designates a conveying roller including a take-out roller 34a of the sheet feed side and a take-in roller 34b of the sheet discharge side. The conveying rollers 34a and 34b convey the note 1 synchronously with the conveying rollers 2a, 2b and 2c by a driving operation of a motor (not illustrated) in accordance with a prescribed conveying signal.

Therefore, in FIG. 5, the note 1 mounted on the upper part of the cassette 32a of the sheet feed side is sequentially conveyed to the irradiated parts 3a and 3c of the reading areas of the CIS 21a and CIS 21c by the conveying rollers 34a and 2a. In the conveying path of the note 1, the photo-sensor 30 for detecting the edge of the note 1, the light transmitting part and the hologram area has five infrared ray sensors provided at equal intervals in the main scanning direction of reading. When the hologram area of the note 1 is formed from one end to the other end in the main scanning direction of reading as shown in FIG. 5, the photo-sensor 30 may be formed with one infrared ray sensor.

Then, the note 1 passing the reading area is conveyed to the irradiated parts 3b and 3d of the reading areas of the CIS 21b and CIS 21d by the conveying roller 2b. Finally, the note 1 is accommodated in the cassette 32b by the conveying roller 2c and the conveying roller 34b. Here, the conveying rollers 2 and 34 are respectively synchronously and accurately driven so that the note 1 is conveyed at a conveying speed of, for instance, 250 mm/sec. In FIG. 5, the same reference numerals as those of FIGS. 1, 2 and 4 designate the same or equivalent parts.

(Control for Turning on and Turning Off Light Source)

Figure 6:
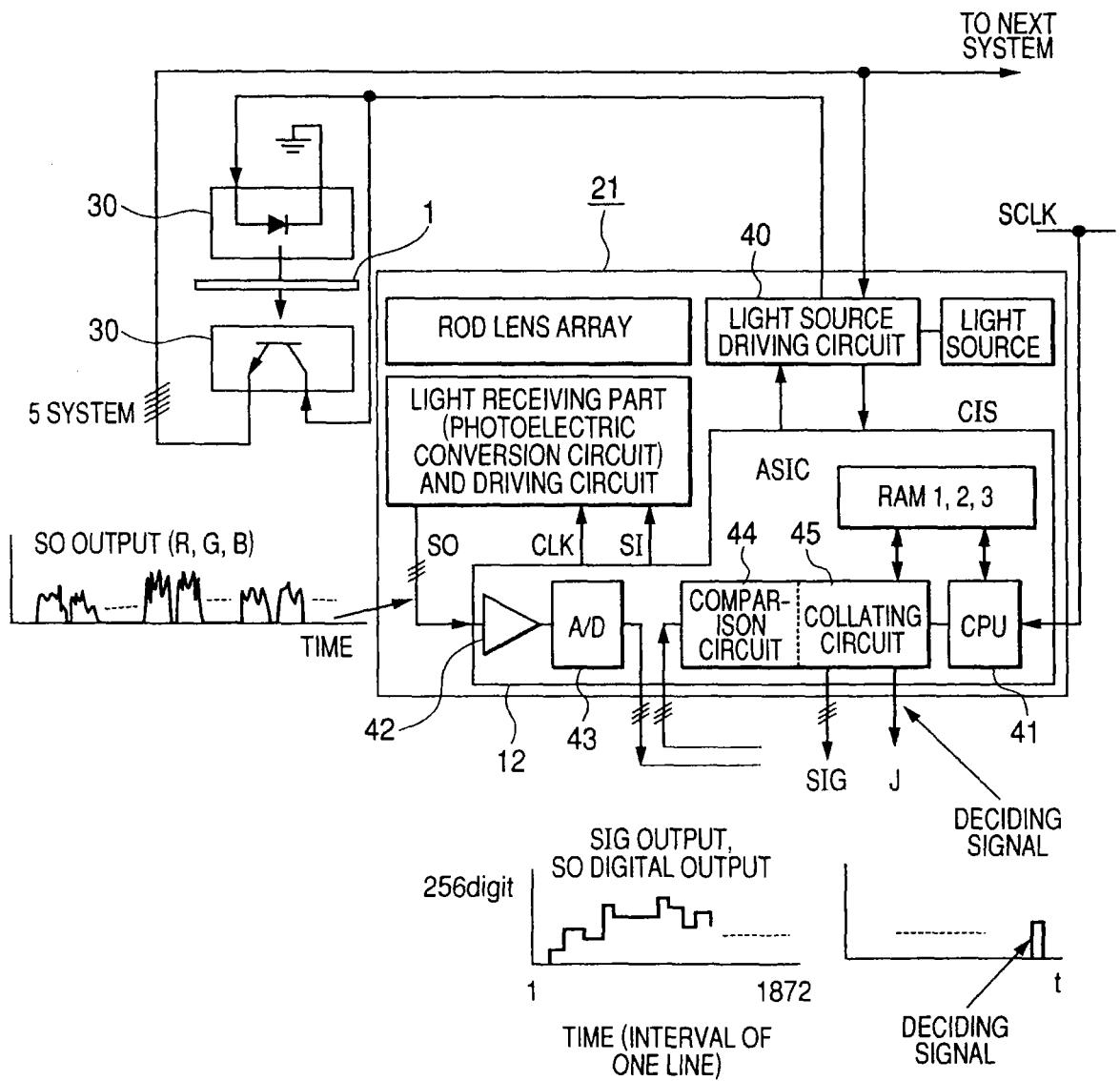
FIG. 6 is a circuit diagram of the image reading device according to the first embodiment of the present invention.

FIG. 6 is a circuit diagram of the image reading device according to the first embodiment. In FIG. 6, 40 designates a light source driving circuit that turns on and turns off the white colored light source 4 and the quasi-white colored light source 6, drives the photo-sensor 30 and transmits output levels from the five photo-sensors 30 to the signal processing IC (ASIC) 12. 41 designates a control part (CPU) for controlling a series of operations of the light source driving circuit 40 or the like.

Initially, a timing signal for firstly detecting the edge part of the note 1 is inputted to the CPU 41 of the ASIC 12 by the photo-sensor 30. At this time, since the conveying speed of the note 1 is fixed, after a time corresponding to the prescribed distance L between the photo-sensor 30 and the irradiated part 3a elapses, the note 1 comes to the irradiated part 3a. Accordingly, the light source driving circuit 40 is controlled to be driven at that timing to turn on the white colored light source 4a of the CIS 21a. Similarly, the white colored light source 4c of the CIS 21c for reading the opposite surface of the note 1 is also turned on. Otherwise, the white colored light sources 4a and 4c may be turned on at the same time by the timing signal for firstly detecting the edge part of the note 1.

Then, while the note 1 passes the photo-sensor 30, the output of the photo-sensor 30 is not higher than a saturation level thereof and varies. The change of the level is determined depending on the transmittance of light of the note 1. However, in the hologram area (part) of the note 1, a metal pattern process or a thermal compression bonding process are performed in addition to the thickness of the note 1, the level falls substantially to zero.

Then, an opposite edge of the note 1 is detected to complete a process of the photo-sensor 30 for the one sheet of the note 1. During this time, the output level of each photo-sensor 30 is sampled at intervals of 5 ms and the size of the note 1 and rough size information of the hologram area are transmitted to the light source driving circuit 40.

Further, when the opposite side edge of the note 1 is detected, since the conveying speed of the note 1 is fixed, immediately after the opposite side edge of the note 1 passes the irradiated part 3a with the lapse of a fixed time, the light source driving circuit 40 is controlled to be driven to turn off the white colored light source 4a of the CIS 21a. The white colored light source 4c of the CIS 21c for reading the opposite surface of the note 1 is also turned off in the same manner.

(Operation of Entire Part of Block Structure)

In FIG. 6, 42 designates an amplifier for amplifying a photoelectrically converted analog image signal (SO). 43 designates an A/D (analog/digital) converter of a resolution of 256 digits (8 bits) for converting the analog signal (SO) to a digital signal. 44 designates a comparison circuit for comparing digital outputs of the SO. 45 designates a collating circuit for collating reference data (collating data) of a hologram with actually measured data.

Firstly, in accordance with a signal of the reading system (SCLK) transmitted from the reading system, when a start signal (SI) set to a reading speed of 0.5 ms/line synchronous with a clock signal (CLK) of the CIS 21 is inputted to the sensor 10, the analog signals (SO) photoelectrically converted in the light receiving part (sensor) 10 are sequentially outputted at that timing. SO is amplified by the amplifier 42, and then, analog/digital (A/D) converted by the A/D converter 43 and inputted to the comparison circuit 44 and the collating circuit 45.

Now, the comparison and the input of the comparison circuit 44 will be described below. In the first embodiment, the CIS 21a is separated from the CIS 21b and the CIS 21a and the CIS 21b individually have the signal processing ICs 12. Accordingly, one input of the comparison circuit 44 of the CIS 21a is directly outputted from the A/D converter 43 of the CIS 21a and the other input of the comparison circuit 44 is outputted from the A/D converter 43 of the CIS 21b. Further, one input of the comparison circuit 44 of the CIS 21b is directly outputted from the A/D converter 43 of the CIS 21b and the other input of the comparison circuit 44 is outputted from the A/D converter 43 of the CIS 21a. That is, the CIS 21a and the CIS 21b have a relation of interpolation.

The light source driving circuit 40 to the photo-sensor 30 is performed by the CIS 21a and the output of the photo-sensor 30 is transmitted commonly to the CIS 21a and the CIS 21b. For comparison, the A/D converted digital data of the CIS 21a that is read by the white colored light source 4a is stored in a RAM 1 and the A/D converted digital data of the CIS 21b that is read by the quasi-white colored light source 6b is stored in a RAM 2.

Subsequently, after the photo-sensor 30 detects the edge of the opposite side of the note 1, when the CIS 21b completely reads the note 1, a subtraction process between the data of the RAM 1 and the data of the RAM 2 is carried out to store difference data in one RAM (for instance, RAM 1). Further, a subtraction process is carried out to store only data larger than a prescribed value in the other RAM (for instance, RAM 2) and an address and the number of data are reduced to obtain an actually measured hologram distribution map. The subtraction processes are not carried out at the same time, because a peculiar bit is corrected during the second subtraction process.

In the second subtraction process of the prescribed value, the data that is not continuously generated relative to the data in the main scanning direction and the conveying direction during forming the map is erased as peculiar data and determined to be zero data. That is, the data is considered to be located outside the hologram area. Further, the peculiar data having a lower numeric value in the continuously generated data is left as data that is not related to the hologram in the hologram area. That is, the data is determined to be the hologram area.

As another means, when there are many peculiar data during forming the hologram distribution map, the hologram distribution map may be thinned to reduce a high resolution map to a ¼ resolution map.

Now, the collating circuit 45 will be described below. The collating circuit 45 is a circuit for collating, for instance, the hologram distribution map stored in the RAM 2 with the reference data (refer it also to as a true hologram distribution map) stored in a RAM 3 as a part of the digital data obtained by previously reading the hologram area of the note 1 by the white colored light source 4 and the quasi-white colored light source 6.

In the data of the RAM 3, a part of the data in the hologram areas of various kinds of notes including the inserting directions of the notes is distributed and stored in designated address areas. In the photo-sensor 30, since the size of the note can be extracted and the approximate size of the hologram area can be recognized, the address of the corresponding data of the RAM 3 is selected to collate with the hologram distribution map so that a collating process time can be shortened. In a collating process, since the number of the addresses of the hologram distribution map is set to be larger than the number of the addresses in the data of the RAM 3 and to have its capacity larger than the data in the address, the data of the RAM 3 is transferred and relatively shifted by a one dimensional interactive register to collate the data with the hologram distribution map for each address.

Figure 7:
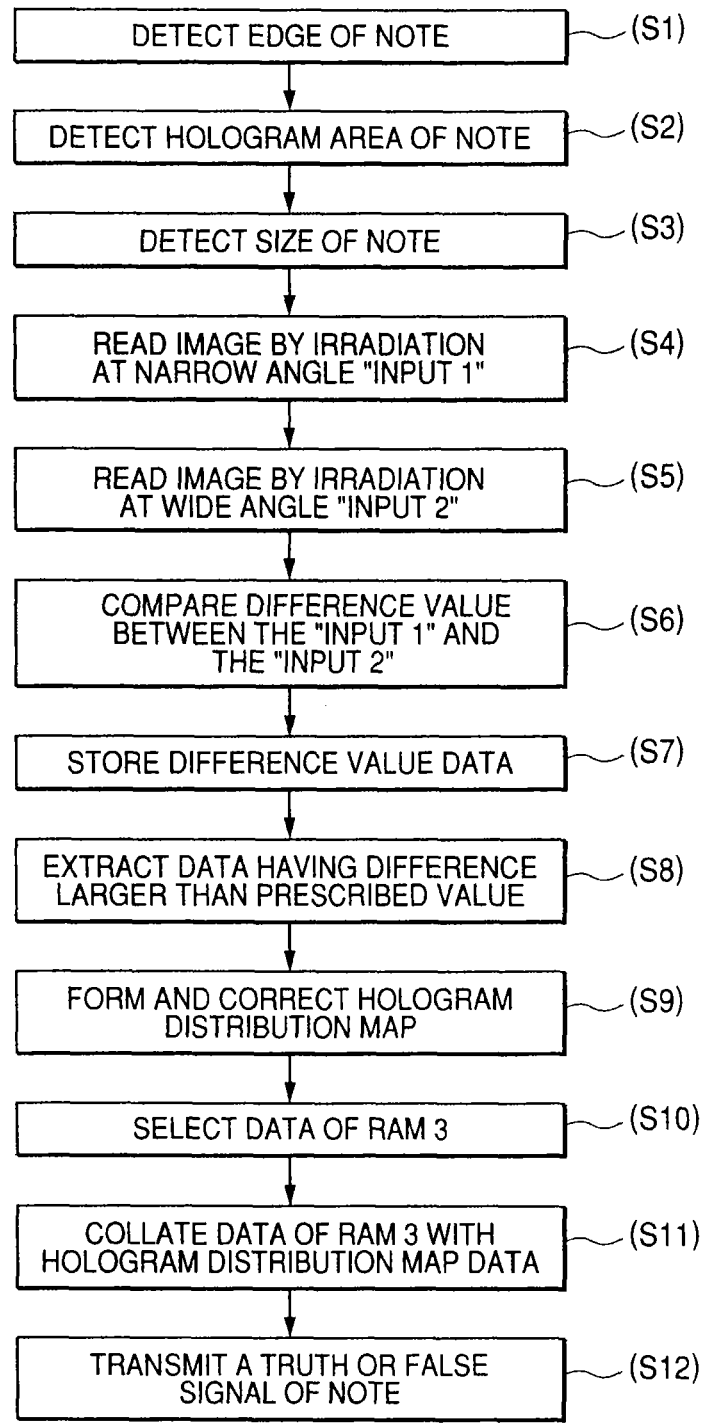
FIG. 7 is a flowchart of the image reading device according to the first embodiment of the present invention.

FIG. 7 shows a series of operations to the collating process in a flowchart. In FIG. 7, STEP 1 (S1) to STEP 3 (S3) is related to the operations of the photo-sensor 30. STEP 4 (S4) is related to the reading operation of the CIS 21a and STEP 5 (S5) is related to the reading operation of the CIS 21b. STEP 6 (S6) to STEP 9 (S9) is related to the comparison and processes thereof. STEP 10 (S10) to STEP 12 (S12) is related the collating processes.

The CIS 21c and the CIS 21d disposed on the other conveying surface of the note 1 are independently driven, though they commonly use the photo-sensor 30, and carry out the same comparison and collating operations as those of the CIS 21a and the CIS 21b.

(Operation Timing)

Figure 8:
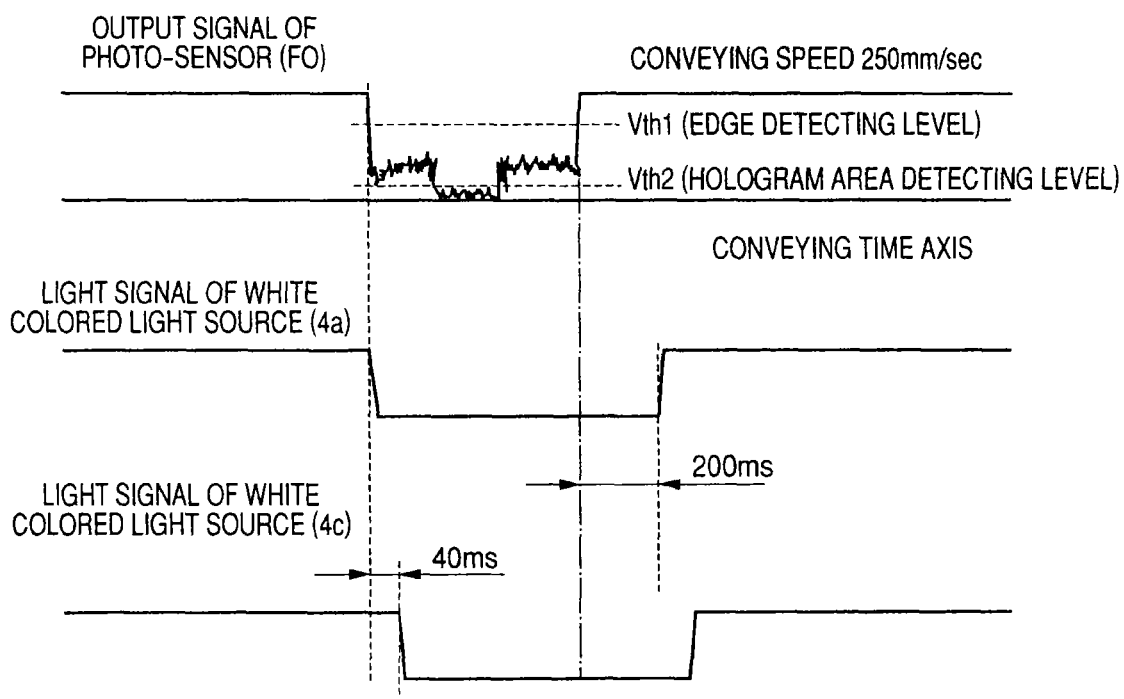
FIG. 8 is a light source control timing chart of the image reading device according to the first embodiment of the present invention.

FIG. 8 is a timing chart showing a change of a relation of an output signal (FO) of the photo-sensor 30 and a lighting signal of a white colored light source 4c mounted on the CIS 21c opposed to the white colored light source 4a mounted on the CIS 21a through the note 1 relative to a time base. It is assumed that the note 1 is conveyed at 250 mm/sec.

In a part that the note 1 is not present in the photo-sensor 30, since the output signal (FO) of the photo-sensor 30 is located at a high level (a saturation level), the light sources 4a and 4c are not respectively turned on (ON). However, when the edge of the note 1 comes to the photo-sensor 30, the level of the output signal (FO) of the photo-sensor 30 is lowered. At this time, when the output signal (FO) of the photo-sensor 30 is located within a range of a prescribed level, that is, when the level of the output signal is lower than Vth1, the white colored light source 4a is turned on and the white colored light source 4c having a different irradiated part is turned on with a little time delay.

Further, when the opposite edge of the note 1 comes to the photo-sensor 30, since the output signal (FO) of the photo-sensor 30 returns to the saturation level, the white colored light source 4a is turned off with a time delay in accordance with the distance (L) between the photo-sensor 30 and the irradiated part 3a. Further, the white colored light source 4c is correspondingly turned off. Further, in the hologram area, since the transmittance of the light of the note 1 is low, the output signal (FO) of the photo-sensor 30 becomes substantially zero.

Figure 9:
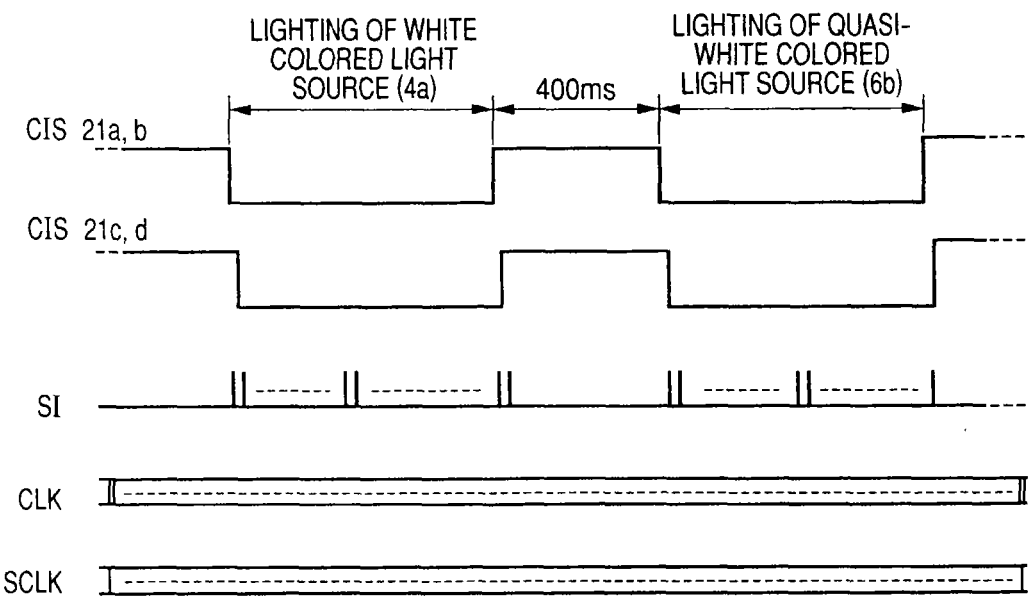
FIG. 9 is a light source control timing chart of the image reading device according to the first embodiment of the present invention.

FIG. 9 shows respectively turned on and turned off periods of the light sources of the CIS 21 in conveying the note. In the CIS 21a and the CIS 21b, the white colored light source 4a of the CIS 21a is tuned on, and then, turned off. Then, after a prescribed time, the quasi-white colored light source 6b of the CIS 21b is turned on, and then, turned off. Similarly, in the CIS 21c and the CIS 21d, the white colored light 4c of the CIS 21c is turned on, and then, turned off. Then, after a prescribed time, the quasi-white colored light source 6d of the CIS 21d is turned on, and then, turned off. When the light sources 4 and 6 are turned on, the start signal (SI) is driven to the continuous lighting section of the clock signal (CLK) to read an image. The system clock signal (SCLK) controls time in association with the CPU 41 at a speed two times as high as that of the CLK.

Figure 10:
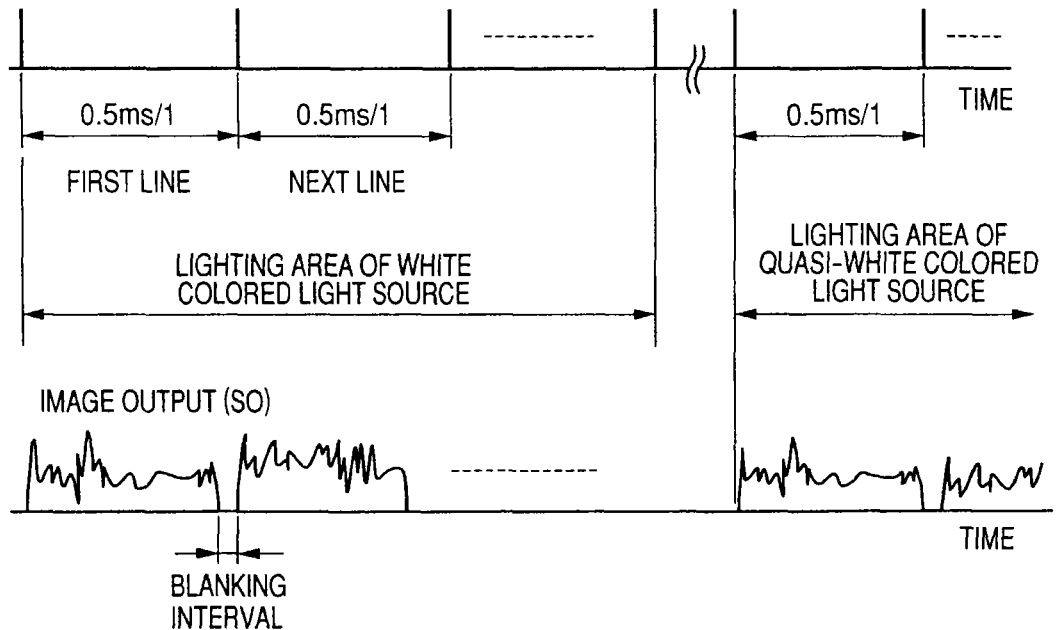
FIG. 10 is an image outputting timing chart of the image reading device according to the first embodiment of the present invention.

FIG. 10 shows a relation between the start signal (SI) and an analog image output (SO). For a reading cycle (0.5 ms/Line) of the CIS 21, the image output (SO) of prescribed number of bits is obtained. Further, in FIG. 10, the change in time of the image outputs (SO) in the lighting area of the white colored light source 4 and the lighting area of the quasi-white colored light source 6 is shown. The image outputs (SO) of the prescribed number of bits sequentially appear synchronously with the start signal (SI). Between lines respectively, a blanking interval is provided to change the reading cycle (0.5 ms/Line) so that the level of the image output (SO) can be finely adjusted.

Namely, since the image read by the white colored light source 4 is the same as the image read by the quasi-white colored light source 6 except images in the hologram areas, the wave forms of the image signals (SO) are macroscopically similar to each other. Each CIS 21 is independent. Accordingly, when the image output (SO) obtained by the white colored light source 4 is different in level from the image output obtained by the quasi-white colored light source 6, the blanking interval of one CIS 21 is changed (that is, the reading cycle is changed), so that the levels of the image outputs (SO) located outside both the hologram areas can be adjusted (corrected).

Figure 11:
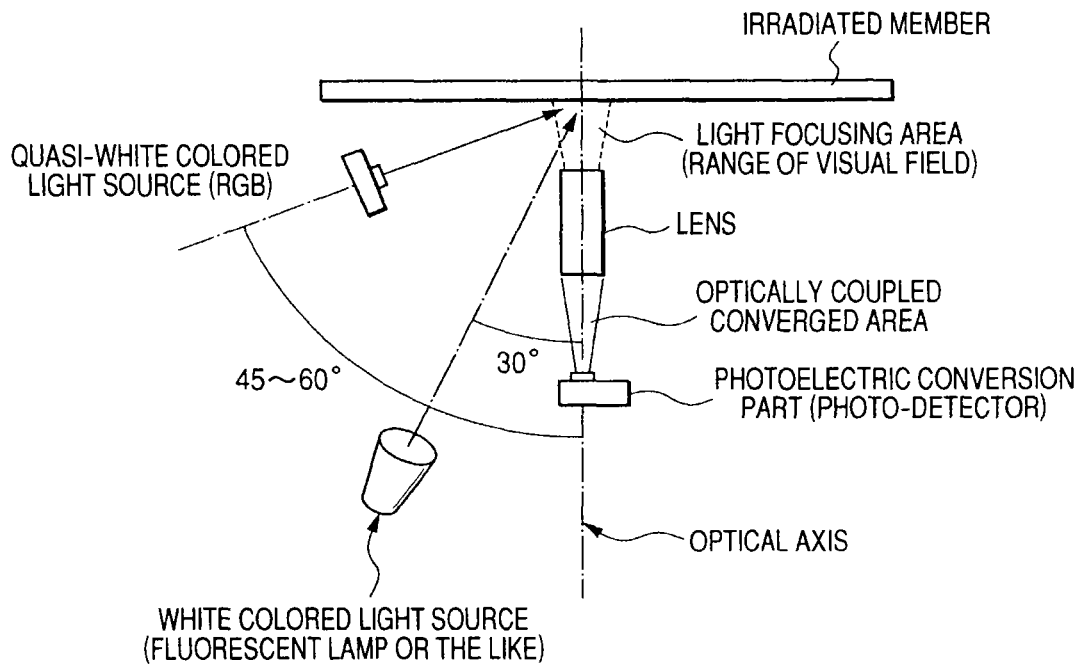
FIG. 11 is a diagram for explaining an angle of irradiation of a light source of the image reading device according to the first embodiment of the present invention.

Now, in FIG. 11, the image of the hologram area will be described below. Since the note 1 is irradiated with the white colored light source 4 and the quasi-white colored light source 6 whose irradiation angle is different from that of the white colored light source 4, in other areas than the hologram areas, a difference arises in the absolute level of the output. However, since the same image is read, similar output wave form distributions are obtained. On the other hand, in the hologram areas, since the note is irradiated with the light sources from different angles, different image outputs are obtained. Especially, when the note is irradiated with the white colored light source 4, the difference obviously appears due to the emission of a plurality of spectrums.

Figure 12:
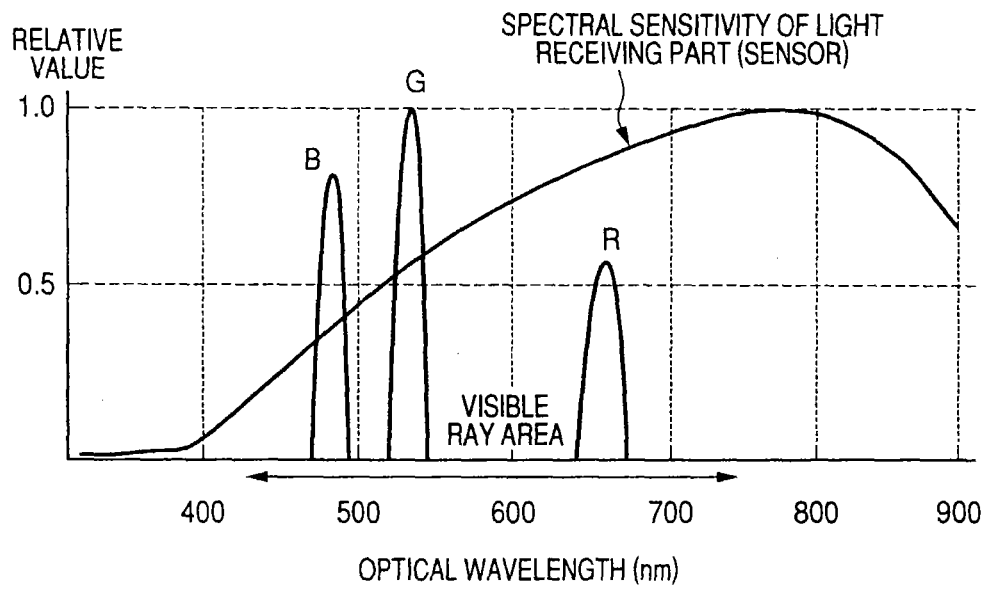
FIG. 12 is a diagram for explaining a kind of a light source and a spectral sensitivity of a sensor of the image reading device according to the first embodiment of the present invention.

In the CIS 21, the white colored light source 4 using a fluorescent lamp having a high output is applied to the note at an incident angle as narrow as 30° from a remote part and the quasi-white colored light source 6 having the emission of the light of RGB as the same white colored light source of a relatively low output is applied to the note at an incident angle as wide as 45 to 60°. In the quasi-white colored light source 6 of RGB, the white colored light source is obtained by covering a plurality of visible ray areas as shown in FIG. 12. However, in the visible ray area, an LED light source having other spectrums may be used and an LED light source emitting infrared rays or ultraviolet rays may be added and used as the quasi-white colored light source 6.

Figure 13A:
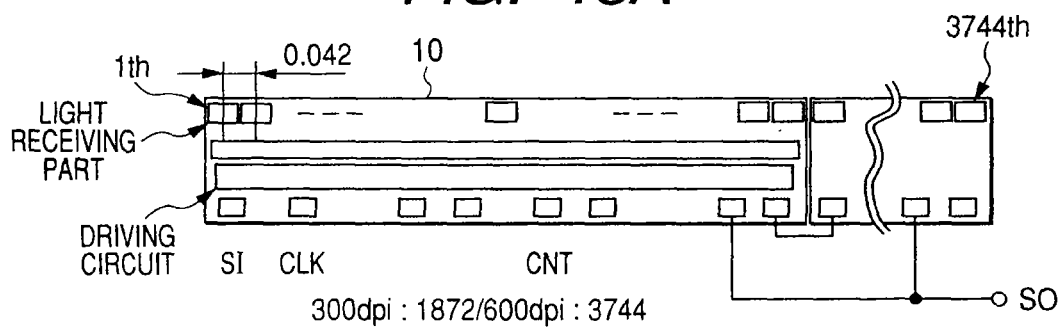
FIGS. 13A and 13B are plan views of the sensor of the image reading device according to the first embodiment of the present invention.
Figure 13B:
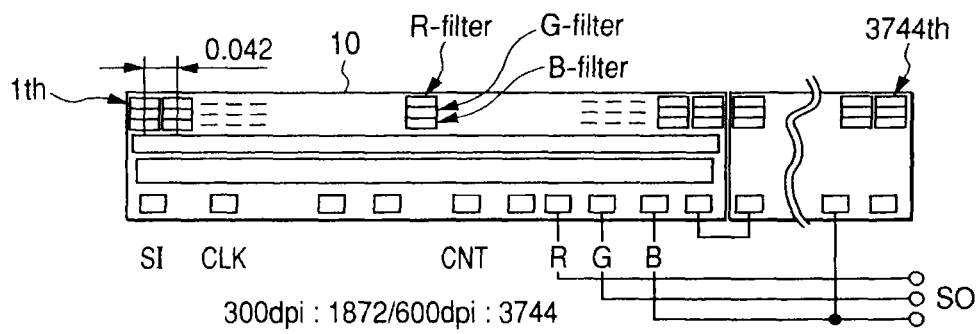

Further, also as shown in FIG. 12, the light receiving part 10 of the CIS 21 characteristically has a high spectral sensitivity to a red colored light emitting side for an optical wavelength. Accordingly, as shown in FIG. 13A, the light receiving part 10 directly receives the reflected light of the white colored light source 4 to read the hologram area. As compared therewith, as shown in FIG. 13B, after the sensor IC is formed, an RGB filter for reading color is formed in the light receiving part 10 by equally dividing pixels into three and applying a transparent gelatin material to the pixels respectively and a part of a plurality of spectrums is filtered before a photoelectric conversion process to suitably select and out the image output (SO). Thus, a truth or falseness of the hologram area can be decided in accordance with a color code. In FIG. 13B, for instance, a filtering function is employed for a green colored light emission (G) in the intermediate part of the visible ray areas to take out the image output (SO) from a G terminal of the sensor 10, so that the truth or falseness of the note 1 can be discriminated by a unique optical recognition different from a natural light.

Figure 14A:
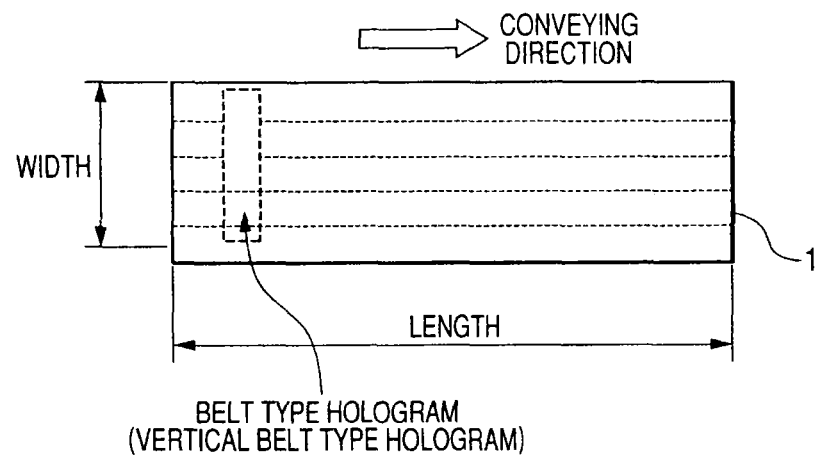
FIGS. 14A and 14B are diagrams for explaining a relation between the inserting direction of a note and a hologram of the image reading device according to the first embodiment of the present invention.
Figure 14B:
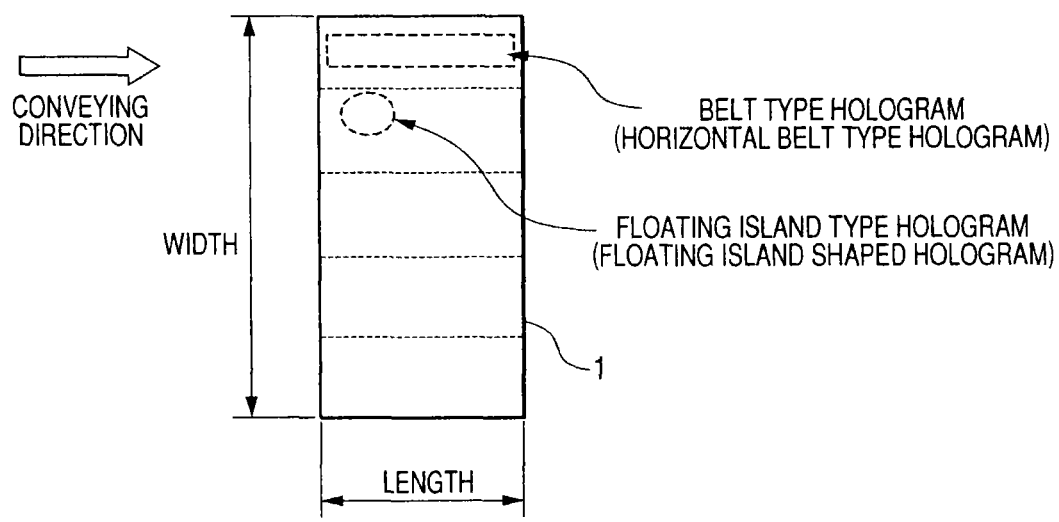

Now, the inserting direction of the note 1 and the identification of the form of the hologram will be described below by referring to FIG. 14. The hologram data stored in the RAM 3 as the reference data is different between a case in which the note 1 is conveyed in a longitudinal direction and a case in which the note is conveyed crosswise. FIG. 14A shows a case in which the note 1 having a belt shaped hologram area in the direction of width of the note 1 is conveyed in the longitudinal direction of the note 1 and detected by the photo-sensors 30, respectively and called a vertical belt type hologram. As compared therewith, FIG. 14B shows a case in which the same note 1 is conveyed crosswise the note 1, detected by a part of the photo-sensors 30 for a relatively long time and called a horizontal belt type hologram. Further, in FIG. 14B, there is a hologram called a floating island type hologram that is detected by a part of the photo-sensors 30 for a relatively short time irrespective of the inserting direction of the note 1.

Now, a method for detecting the size of the note 1 or the size of the hologram area on the basis of an output from the photo-sensor 30 will be specifically described by using the vertical belt type hologram as an example. FIG. 15 shows a signal comparing circuit incorporated in the light source driving circuit 40 for inputting the output (FO) of the photo-sensor 30 to the ASIC 12 via the light source driving circuit 40. The outputs of the photo-sensors 30 are respectively processed by the ASIC 12 by specifying the levels of the photo-sensors 30 by level comparators of two systems incorporated in the light source driving circuit 40.

FIG. 16 shows the change of the outputs of the photo-sensors 30 with the lapse of the conveying time of the note 1. In FIG. 16, in the FO1 to FO4 of the photo-sensors 30, after 50 ms from the detection of the edge of the note, the hologram area is detected. After 70 ms, the passage of the hologram area of the note 1 is detected. After 150 ms, the opposite edge of the note 1 is detected.

Further, as for the read width of the note 1, in FIG. 16, the output (FO5) of the photo-sensor 30 does not always detect the signal of the note 1.

As described above, when the note 1 is conveyed in the longitudinal direction of the note 1, the length of the note 1 is determined from an elapsing time from the detection of the first edge of the note 1 to the detection of the opposite edge of the note 1. The length of the hologram area of the note 1 is understood from a time of the passage of the hologram area of the note 1.

Further, the approximate width of the note 1 is known from the positions of the FO1 to F05 of the photo-sensors 30 spaced mutually and the approximate width of the hologram area of the note 1 is additionally known. In detection of the width, when a high accuracy is required, intervals at which the photo-sensors 30 are disposed may be allowed to come close to each other or another CIS on which a transmission type light source is mounted may be added to meet the request.

Further, when the detecting area of the photo-sensor 30 is relatively wide so that a response to the edge of the note 1 is slow, a semiconductor laser sensor having a beam spot of about 50 µmø may be used to enhance an accuracy for the detecting position of the edge, shorten a response time to the detecting level and decrease a sampling time as an interval for a detecting time. Thus, the accuracy in time for detecting the size of the note 1 or the position of the hologram area may be improved.

As described above, the CPU 41 sets an optimum kind (address) of the reference data stored in the RAM 3 to be collated on the basis of the information of outputs (designated by MO1 to MO10) of the comparators 1 and 2 shown in FIG. 15.

(Collation)

Figure 17:
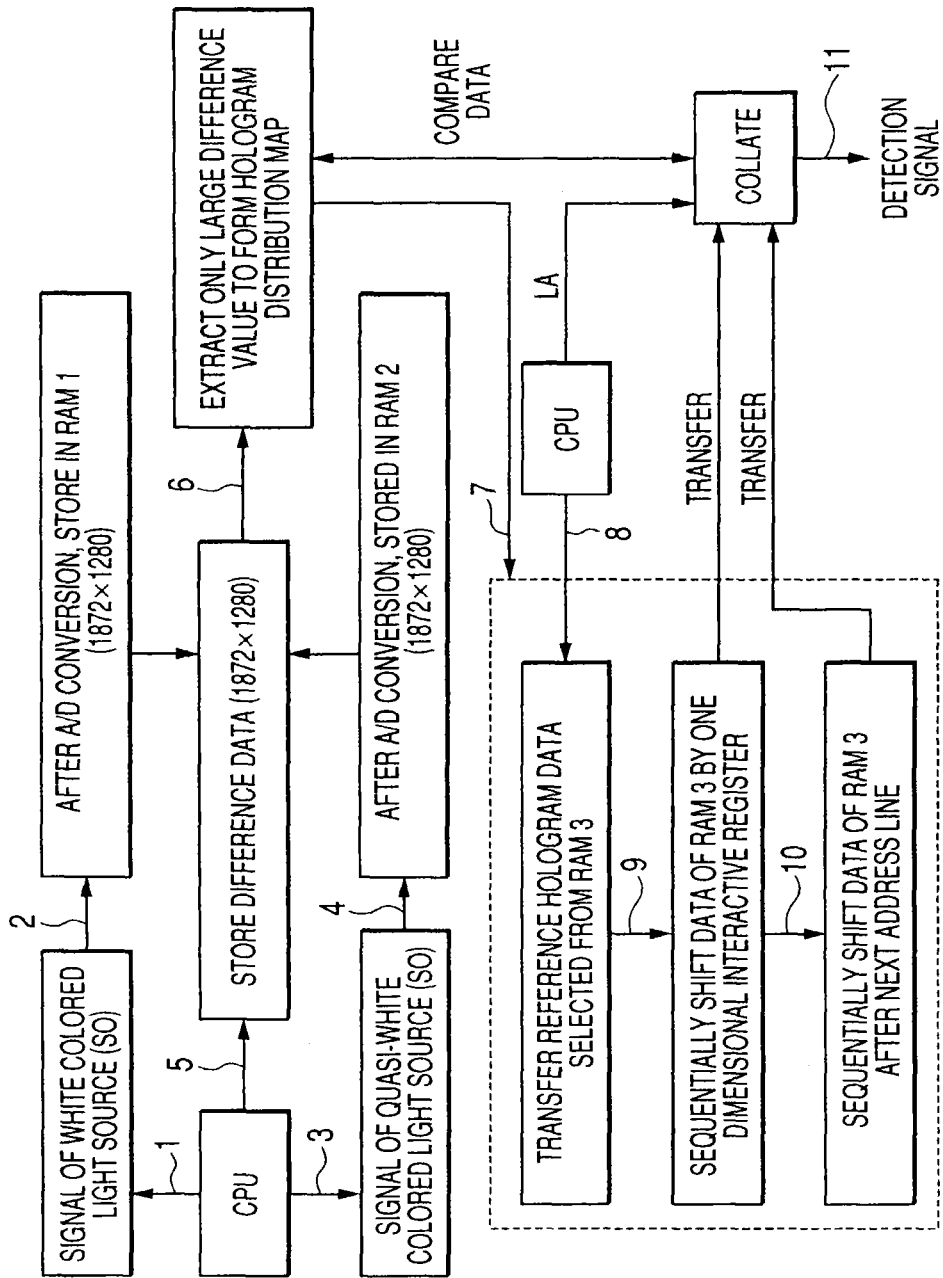
FIG. 17 is a flowchart of a series of operations of the image reading device according to the first embodiment of the present invention.

Now, referring to FIG. 17, a collating method will be described below in detail. In the first embodiment, in the case of 300 dpi, the reading density in the direction of a read width is 1872 bits. In the case of 600 dpi, the reading density is 3744 bits. Either density may meet the note of about 160 mm or smaller. The number of read lines is determined to be 1280 bits that meets the note of 160 mm or smaller. Here, as shown in FIG. 13B, a CNT terminal (a reading density switching terminal) of the sensor 10 is set to 300 dpi and a photoelectric conversion output of a total of 1872 bits is described in which only the odd number bits of pixels respectively operate.

Initially, the white colored light source 4a is turned on and a fetched data signal is stored in the RAM 1 having a 1872× 1280 area and transferred at the same time to the reading system as a digital image signal (SIG) in a real time for referring to and displaying an image. Similarly, the quasi-white colored light source 6b is turned is turned on and a fetched data signal is stored in the RAM 2 having a 1872× 1280 area.

Then, the CPU 41 performs a subtraction process of the address data of the data of the RAM 1 and the data of the RAM 2 to compare differences respectively and store the data of differences of absolute values to the RAM 1. Then, the CPU 41 performs a subtraction process to specify the address in which a change is large, respectively reduce the data in the addresses and stored the data in the RAM 2. Since the image read by the white colored light source 4a and the quasi-white colored light source 6b is the same, the absolute values of the data of other parts than the hologram area are different, however, the data is similar. Therefore, the above-described signal process is carried out. At this time, the process of the peculiar bit is carried out as described above, and accordingly, the data smaller than a prescribed value may be possibly treated as hologram area data. This hologram area data is called a hologram distribution map to specify a kind or a candidate of the data of the RAM 3 and collated with reference hologram data (collating data) transferred from the RAM 3.

In the difference between the data of the RAM 1 and the data of the RAM 2 that are initially fetched, the data of the RAM 1 is macroscopically compared with the data of the RAM 2 in the data area corresponding to both the edge parts of the note 1. The displacement of addresses is corrected by rearranging the addresses between the data of the RAM 1 obtained by the white colored light source 4 and the data of the RAM 2 obtained by the quasi-white colored light source 6. Thus, the consistency of the data is preferably maintained.

FIG. 18 shows an example of the specific difference data of the RAM 1 and the RAM 2 and the hologram area is specified and determined by the difference value. In FIG. 18, 35 digits or more is selected to determine to be the data of the belt type hologram area.

FIG. 19A shows a specific example of a floating island type hologram area. When the kind of the hologram area is determined, CPU 41 specifies the kind of the data of the RAM 3 meeting a suitable hologram distribution map to transfer the reference hologram data (collating data) of the RAM 3 to the collating circuit and sequentially collate the data of the RAM 3 with the data of the RAM 2.

Now, the collation will be more described below by using the floating island type hologram data shown in FIGS. 19A to 19C. FIG. 19B shows data obtained by taking out only a floating type hologram not less than 35 digits. The floating type hologram data is collated with data stored in the RAM 3 that is previously set as the reference hologram data (collating data) shown in FIG. 19C. Here
the number of addresses and the capacity of the number of data of each address that are stored in the RAM 2 are set to be larger than the capacity of the data stored in the RAM 3.

Figure 20:
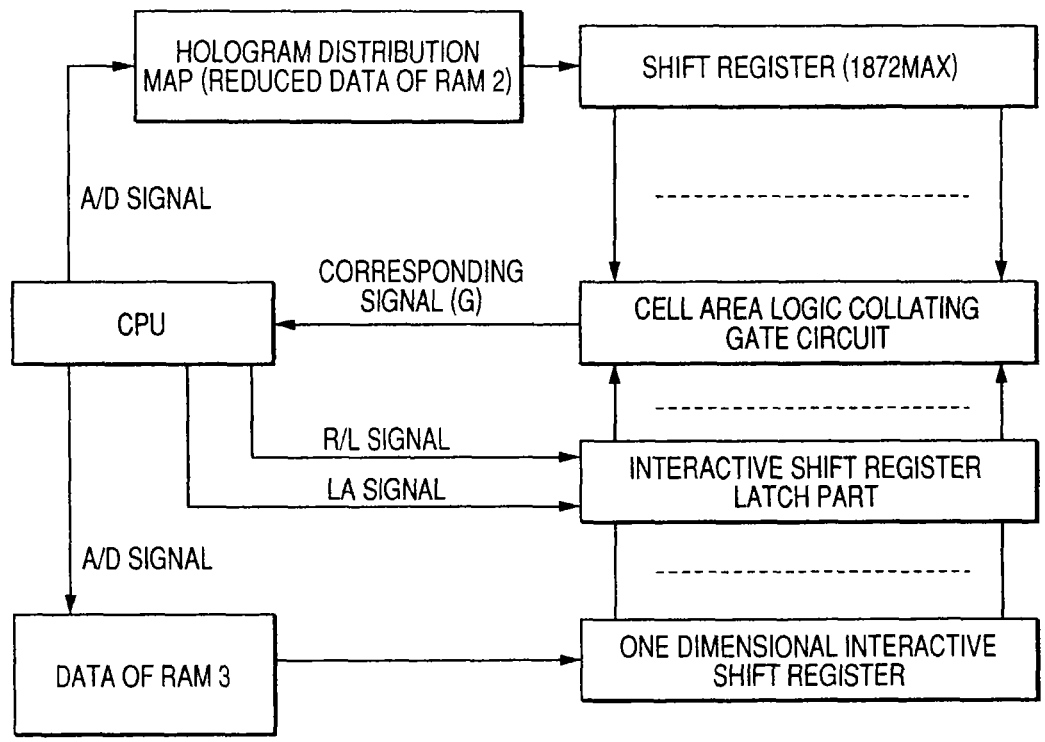
FIG. 20 is a block diagram for explaining a collating method of the image reading device according to the first embodiment of the present invention.

Subsequently, as shown in FIG. 20, the data of the RAM 3 is transferred to the one dimensional interactive shift register by an A/D signal (an address designating signal) for each address and transferred again to an interactive shift register latch part (a latch part). In the latch part, the data is collated with the data of the RAM 2 by an R/L signal (a right and left shift signal) for each address of the data of the RAM 2.

Figure 21:
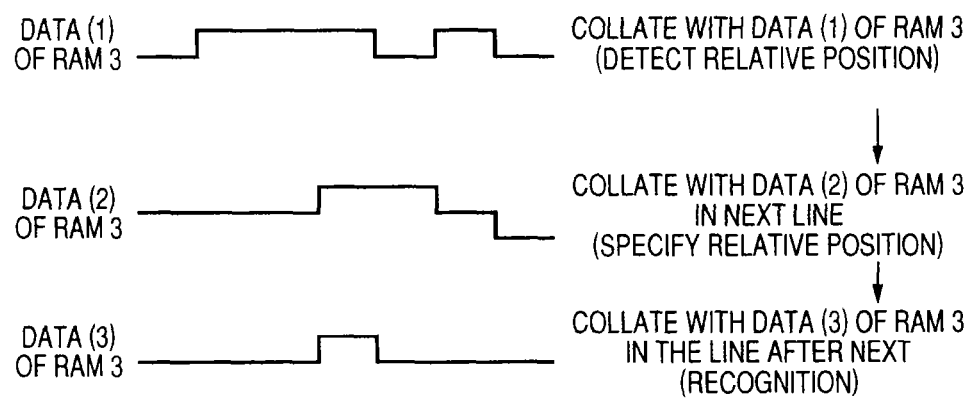
FIG. 21 is a collating wave form diagram of the image reading device according to the first embodiment of the present invention.

The data of the RAM 2 is directly inputted to a cell area logic collating gate circuit composed only of a logic circuit through a shift register by the A/D signal. On the other hand, in the data of the RAM 3, the data in the address is shifted (swept) rightward and leftward by the R/L signal from the CPU 41 a plurality of times. An LA signal (a latch signal) is transmitted at each time of the shift of each data of the RAM 3 and the data is collated in the cell area logic collating gate circuit for each time. The collation is carried out in accordance with the rise and fall of the data in each address. As shown in FIG. 21, whether or not the rise and fall of the data (1) of the RAM 3 correspond to those of the address of the data of the RAM 2 is checked for each address of the data of the RAM 2.

When the data (1) of the RAM 3 corresponds to the data of an arbitrary address of the RAM 2, the cell area logic collating gate circuit transmits a corresponding signal to the CPU. The CPU 41 specifies the address of the RAM 2 on the basis of the number of transmissions of the R/L signal to the address of the RAM 2.

Then, the data (2) of the RAM 3 as the data of a next address of the RAM 3 is transferred and collated with the data of a next address of the specified address of the RAM 2. When the data correspond to each other, the cell area logic collating gate circuit transmits a corresponding signal to the CPU 41. At this time, the CPU 41 may output a correspondence deciding signal to the reading system. However, the CPU may transfer the data (3) of the RAM 3 as the data of the address after next of the RAM 3, collate it with the data of the address after next of the specified address of the RAM 2 to recognize the correspondence thereof, and then, transmit a deciding signal to the reading system.

In the first embodiment, the digital data of the RAM 1 to RAM 3 is set to 5 digits as a collating unit for convenience' sake, however, 10 digits may be used. Further, when the difference is compared in the white colored light source 4a or the quasi-white colored light source 6a, an address for fetching several pixels of image data stored in the RAM 1 or the RAM 2 may possibly change due to a conveying shift in the direction of width of the note 1 as short as 0.1 mm or an unevenness in conveying speed of the note 1. In such a case, since, as the data stored in the RAM 1 and the RAM 2, not an image signal, but only a truth and false deciding signal is required, average data of mutually adjacent bits and next lines is stored in the RAM 1 and the RAM 2 like the process of the above-described peculiar bit. Thus, an identifying resolution may be set to ¼ to simplify a collating decision.

Figure 22:
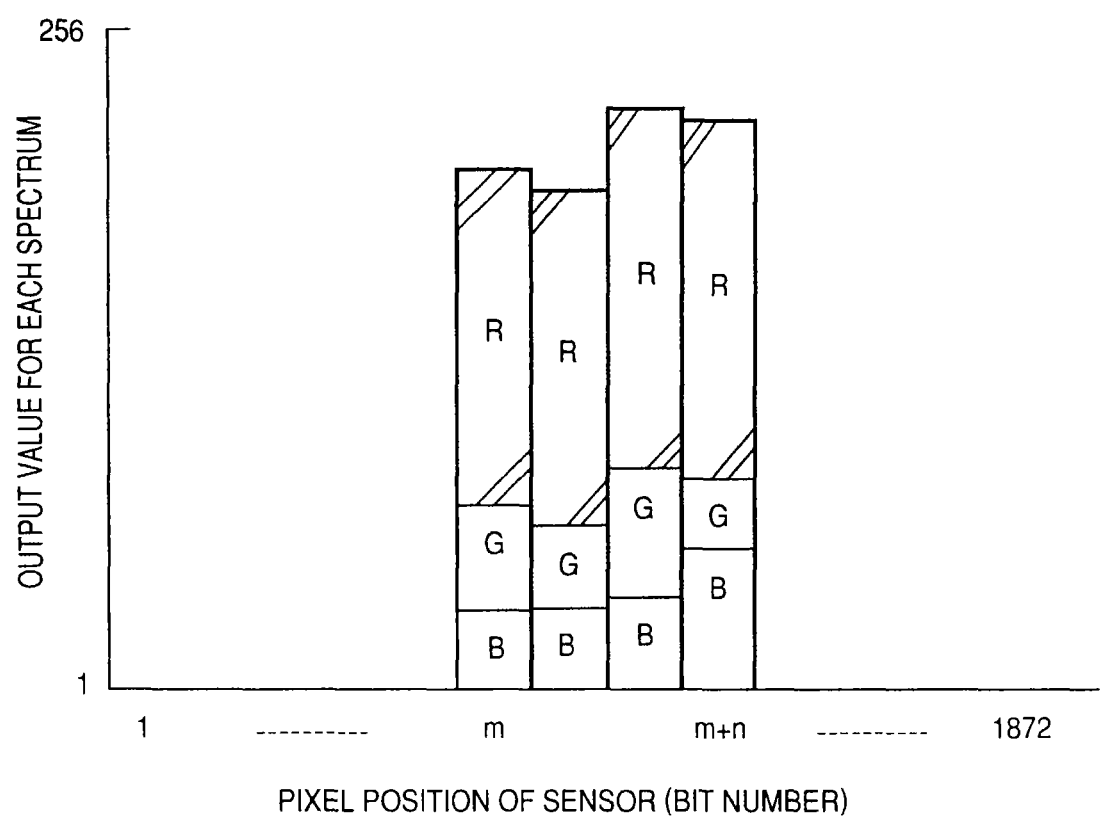
FIG. 22 is a diagram for explaining outputs of the sensor divided respectively for spectrums in the image reading device according to the first embodiment of the present invention.

Further, FIG. 22 shows an example when the output of the sensor 10 is resolved for each spectrum. In the drawing, the reflected light of the hologram area mainly includes red colored (R) light. Further, in the sensor 10 produced in a semiconductor producing process, as shown in a spectral sensitivity curve of the sensor in FIG. 12, as the optical wavelength becomes higher in the visible ray area, a light receiving sensitivity becomes higher. Accordingly, the output value of the sensor 10 is affected with the red colored light. Thus, when a problem arises in a truth and false discriminating accuracy, the image output (SO) is preferably received through an R-Filter shown in FIG. 13B. In that case, as the reference data stored in the RAM 3, data actually measured under the same conditions is stored.

Further, in the first embodiment, since a high definition hologram area by wiring the data by laser is mainly described, the sensor 10 having a resolution of 300 dpi is used to have data for each pixel and a digital converting level of 256 digits (8 bits). However, in a decision of the truth or falseness of a hologram area by using a simple prism or a reflecting member and a printing pattern, since an image pattern is not fine, the digital converting level of 64 digits (6 bits) may be used. In a hologram of a printing pattern optically changing and different only depending on an angle for viewing, a sensor IC having a resolution of about 8 dots/mm may be used to decide a truth or falseness.

As described above, the irradiated parts disposed along the conveying direction of the note 1 are irradiated with lights at different angles to detect the difference of the spectrums of the reflected lights generated in the hologram area so that the image reading device capable of highly accurately discriminating a truth or falseness can be obtained.

Second Embodiment

Figure 23:
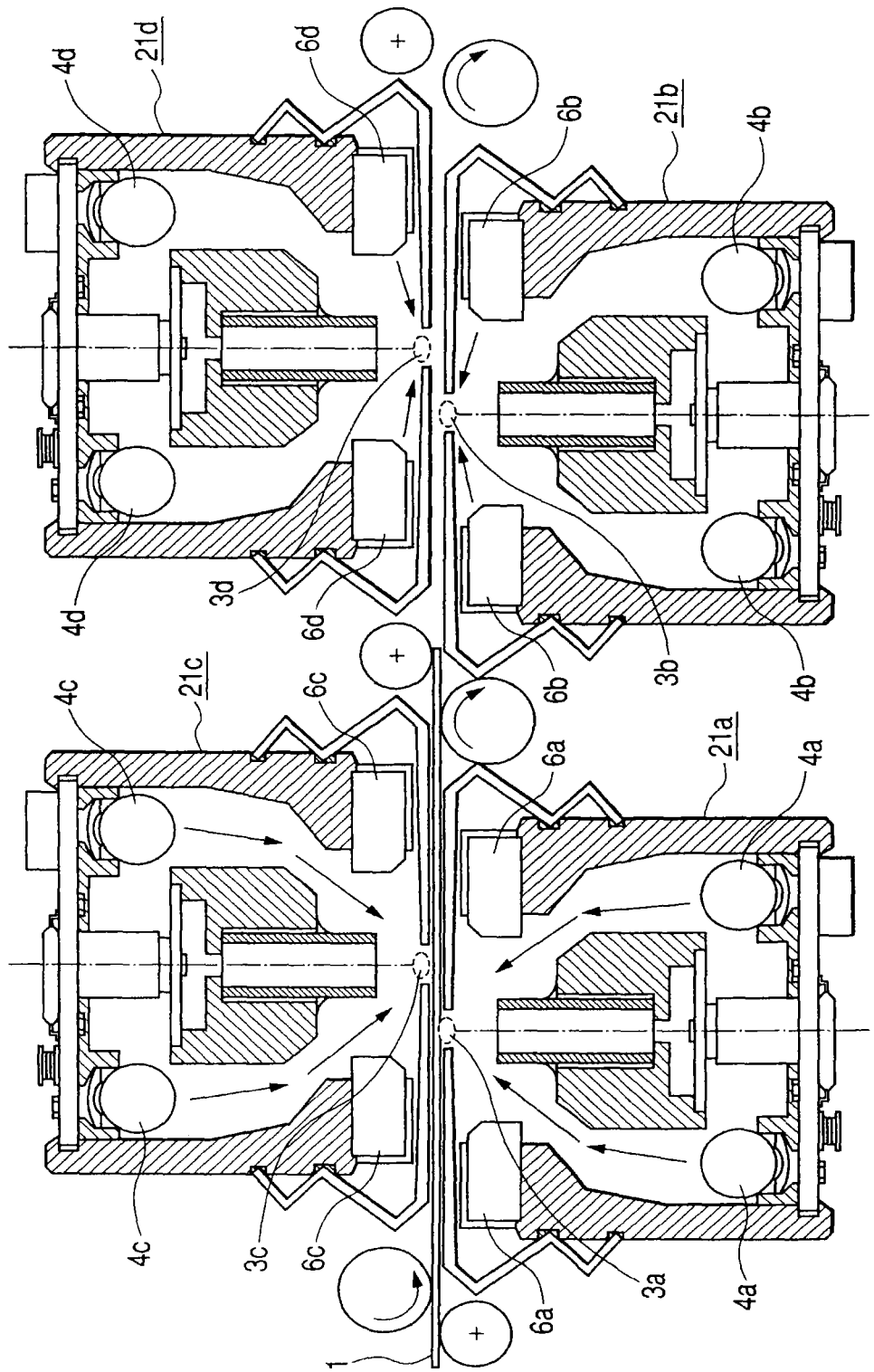
FIG. 23 is a sectional structural view of an image reading device according to a second embodiment of the present invention.

A second embodiment of the present invention will be described by referring to FIG. 23. FIG. 23 is a sectional structural view of an image reading device according to the second embodiment. In FIG. 23, 21 designates a CIS in which white colored light sources 4 and quasi-white colored light source 6 are disposed at both the sides of an irradiated part 3. A CIS 21a and a CIS 21b are arrange on one surface side of a note 1 and a CIS 21c and a CIS 21d are arranged on the other side of the note 1. In the drawing, the same reference numerals show the same or equivalent parts as those of FIG. 2.

Now, a structure will be described below. In FIG. 23, two white colored sources 4 are mounted on one CIS 21 and the note 1 in the irradiated part 3 is simultaneously irradiated with the white colored light sources 4 at the same angle from both sides. Similarly, two quasi-white colored light sources 6 are mounted on the CIS 21 and the note 1 in the irradiated part 3 is irradiated simultaneously with the quasi-white colored light sources 6 at the same angle different from that of the white colored light sources 4 from both sides.

As described above, since the note 1 is irradiated with the lights at the same time from both the sides, even when uneven surfaces are generated in the note 1 in the irradiated part 3 due to the change of a swell during conveying the note 1, a shadow generated in one of the uneven surfaces of the note 1 does not appear as compared with a case that the note is irradiated with the light from one side, because the note 1 is irradiated with the lights at the same angle from both the sides of one surface of the note 1. An inconvenience due to unevenness in conveying the note 1 can be cancelled, whether the note 1 is true or false can be discriminated or an image can be read in a stable way. The operation, the function and the discriminating method are the same as those described in the first embodiment except that the lights are applied to the note from both the sides.

Third Embodiment

Figure 24:
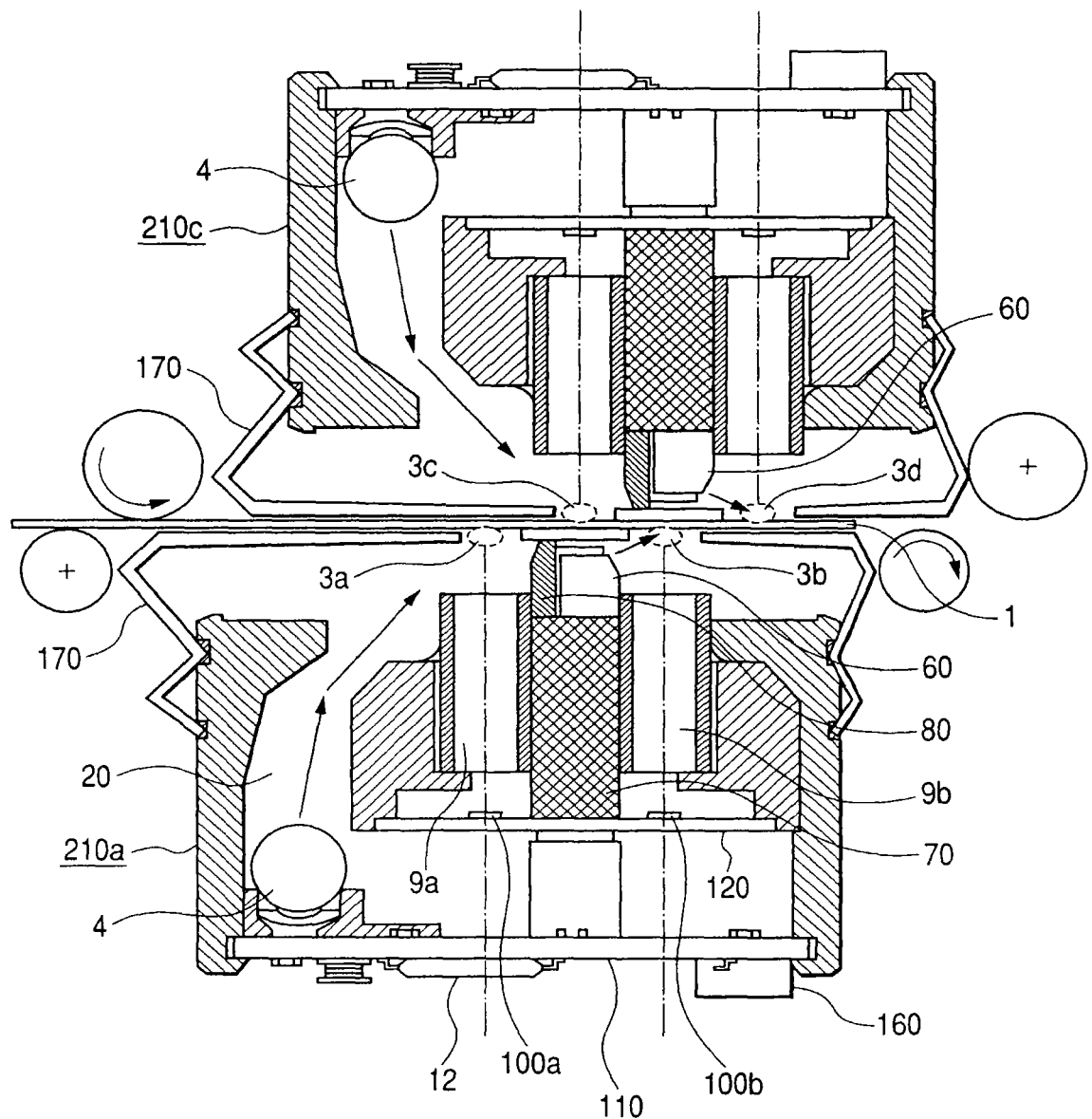
FIG. 24 is a sectional structural view of an image reading device according to a third embodiment of the present invention.

A third embodiment of the present invention will be described by referring to FIG. 24. FIG. 24 is a sectional structural view of an image reading device according to the third embodiment. In FIG. 24, 60 designates a quasi-white colored light source (a second light source) composed of an LED light source. 70 designates a black colored block (a first light shield member) made of a plastic material to hold the quasi-white colored light source 60. 80 designates a second light shield member made of a plastic material and is held by the black colored block. 100 designates a sensor. 100*a* designates a first sensor and 100*b* designates a second sensor. 110 designates a substrate (refer it also to as a first substrate) for holding a white colored light source 4. 120 designates a sensor substrate (refer it also to as a second substrate) on which the sensor 100 is mounted. 160 designates an input and output connector (an external connector) for transmitting and receiving a signal. 170 designates a transmitting member having two irradiated parts 3. 210 designates a CIS. 210*a* is a CIS arranged on one surface side of a note 1 and 210*c* is a CIS arranged on the other surface side of the note 1. In the drawing, the same reference numbers designate the same or equivalent parts of FIG. 1.

Now, a structure will be described below. In FIG. 24, two lens arrays 9*a* and 9*b* are mounted on one CIS 210 and two irradiated parts 3 are respectively provided correspondingly to the lens arrays 9. When the note 1 is conveyed, the note 1 located in the irradiated part 3*a* is initially irradiated with the white colored light source 4 and the reflected lights thereof are focused by the lens array 9*a* and received by the sensor 100*a*. Further, when the note 1 is conveyed to the irradiated part 3*b*, the note 1 located in the irradiated part 3*b* is irradiated with the quasi-white colored light source 60 and the reflected lights thereof are focused by the lens array 9*b* and received by the sensor 100*b*. The CIS 210*c* also independently operates in the same manner as that of the CIS 210*a*.

Figure 25:
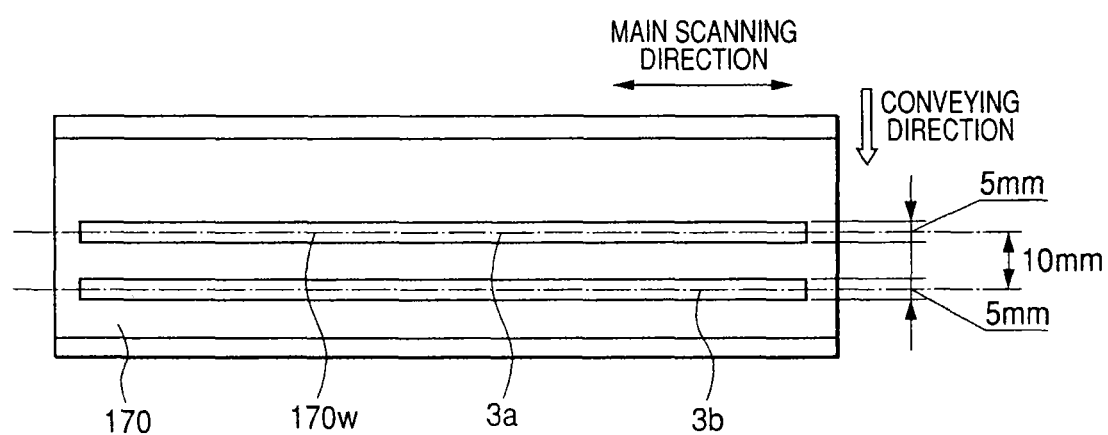
FIG. 25 is a plan view of a transmitting member of the image reading device according to the third embodiment of the present invention.

FIG. 25 is a plan view of the transmitting member 170 mounted on the CIS 210. 170*w* designates two opening parts provided in the transmitting member 170. The irradiated parts 3*a* and 3*b* are located along the opening parts 170*w*.

As described above, the white colored light source 4 and the quasi-white colored light source 60 are mounted on one CIS 210 and the irradiated parts 3 provided at different positions from each other along the conveying direction are irradiated with the light at different irradiation angles, so that whether a hologram is true or false can be discriminated by one CIS 210. Further, as compared with the first and second embodiments, since an external casing is integrally formed, the number of control lines for transmitting and receiving signals or signal processing ICs such as comparison and collating circuits is anticipated to be reduced so that a compact image reading device can be realized.

The entire disclosure of Japanese Patent Application No. 2006-070519 filed on Mar. 15, 2005 including specification, claims, drawings and abstract is incorporated herein be reference in its entirety.

What is claimed is:

1. An image reading device comprising:
    first and second image reading portions which are arranged to be vertically inverted with respect to each other and to face each other with an irradiated member, which is configured to be conveyed by a conveying unit in a conveying direction along a conveying path, provided therebetween, each of the first and second image reading portions including:
    a first light source for applying light to an irradiated part in a hologram area of the irradiated member;
    a second light source separated from the first light source along the conveying direction, to apply light to an irradiated part in the hologram area when the hologram area is conveyed by a prescribed distance from a position at which the hologram area is irradiated by the first light source, and provided so as to apply light to the irradiated part when the hologram area is conveyed by the prescribed distance at an irradiation angle different from an irradiation angle at which the irradiated part is irradiated with the light of the first light source, a magnitude of the irradiation angle of the second light source being different from a magnitude of the irradiation angle of the first light source;
    first and second rod lens arrays for respectively converging the lights of the first and second light sources reflected by the irradiated part in the hologram area, a respective optical axis of the first and second rod lens arrays being disposed orthogonal to the surface of the irradiated member;
    first and second sensors for receiving the lights respectively converged by the first and second rod lens arrays to photoelectrically convert the lights; and
    a checking unit for comparing output signals of the first and second sensors with each other to check whether a hologram area of the irradiated member is true or false,
    wherein the first light source of the first image reading portion applies light to a first position of the conveyance path, the second light source of the first image reading portion applies light to a second position of the conveyance path, the first light source of the second image reading portion applies light to a third position of the conveyance path, and the second light source of the second image reading portion applies light to a fourth position of the conveyance path,
    wherein the first position and the third position are spaced from each other in the conveying direction, and
    wherein the second position and the fourth position are spaced from each other in the conveying direction.

2. The image reading device according to claim 1,
wherein the first light sources of the first and second image reading portions simultaneously apply light to the irradiated member, and
wherein the second light sources of the first and second image reading portions simultaneously apply light to the irradiated member.

\* \* \* \* \*